(12) United States Patent
Waas et al.

(10) Patent No.: US 11,260,566 B2
(45) Date of Patent: Mar. 1, 2022

(54) METHODS TO INCREASE STRUCTURAL PERFORMANCE, STRENGTH AND DURABILITY OF FABRIC-REINFORCED COMPOSITE MATERIALS BY PRE-STRESSING

(71) Applicant: THE REGENTS OF THE UNIVERSITY OF MICHIGAN, Ann Arbor, MI (US)

(72) Inventors: Anthony M. Waas, Ann Arbor, MI (US); Sean Ahlquist, Ann Arbor, MI (US); Jonathan Wesley McGee, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 16/746,103

(22) Filed: Jan. 17, 2020

(65) Prior Publication Data
US 2020/0147844 A1 May 14, 2020

Related U.S. Application Data

(63) Continuation of application No. 14/854,175, filed on Sep. 15, 2015, now Pat. No. 10,576,670.
(Continued)

(51) Int. Cl.
*B29C 45/14* (2006.01)
*D04B 15/66* (2006.01)
(Continued)

(52) U.S. Cl.
CPC .......... *B29C 45/1418* (2013.01); *B29B 11/16* (2013.01); *B29C 45/7207* (2013.01);
(Continued)

(58) Field of Classification Search
None
See application file for complete search history.

(56) References Cited

U.S. PATENT DOCUMENTS

| | | |
|---|---|---|
| 4,065,838 A | 1/1978 | Jungpeter et al. |
| 4,194,041 A | 3/1980 | Gore et al. |
| | (Continued) | |

OTHER PUBLICATIONS

Heinrich et al., "Investigation of Progressive Damage and Fracture in Laminated Composites Using the Smeared Crack Approach," CMC-Computers Materials & Continua, 35 (2), pp. 155-181 (2003).
(Continued)

*Primary Examiner* — Shawn Mckinnon
(74) *Attorney, Agent, or Firm* — Harness, Dickey & Pierce, P.L.C.

(57) ABSTRACT

Methods to increase structural performance, strength, and durability of textile-reinforced composite materials are provided. The textile reinforcement may be knitted, for example, in a flat bed weft knitting machine. The method may include pre-stressing a textile reinforcement preform by applying tension. A polymeric precursor may be introduced to the pre-stressed textile reinforcement preform. The polymeric precursor may then be cured or consolidated, followed by releasing of the applied tension to form the composite article comprising polymer and the pre-stressed textile reinforcement. In other aspects, a composite article is provided that has a pre-stressed textile reinforcement structure and a cured polymer. The textile reinforcement may be a knitted, lightweight, seamless, unitary structure. The knitted reinforcement structure may have distinct first and second knitted regions with different levels of pre-stress, thus providing enhanced control over strength, rigidity, and flexibility of the composite article.

18 Claims, 19 Drawing Sheets

A

B

Related U.S. Application Data

(60) Provisional application No. 62/050,527, filed on Sep. 15, 2014.

(51) Int. Cl.

| | | |
|---|---|---|
| *D06B 1/10* | (2006.01) | |
| *B29C 45/72* | (2006.01) | |
| *D06M 15/564* | (2006.01) | |
| *D06M 15/59* | (2006.01) | |
| *D06M 15/55* | (2006.01) | |
| *D06M 15/07* | (2006.01) | |
| *D06M 15/41* | (2006.01) | |
| *D06M 15/70* | (2006.01) | |
| *B29C 70/22* | (2006.01) | |
| *D04B 1/22* | (2006.01) | |
| *D04B 1/10* | (2006.01) | |
| *D04B 37/02* | (2006.01) | |
| *B29B 11/16* | (2006.01) | |
| *B29C 70/56* | (2006.01) | |
| *B29C 70/48* | (2006.01) | |
| *D06M 15/507* | (2006.01) | |
| *D06M 101/40* | (2006.01) | |
| *D06M 101/36* | (2006.01) | |
| *B29K 63/00* | (2006.01) | |
| *B29K 105/08* | (2006.01) | |
| *B29K 709/08* | (2006.01) | |
| *D06M 101/20* | (2006.01) | |

(52) U.S. Cl.
CPC .............. *B29C 70/22* (2013.01); *B29C 70/48* (2013.01); *B29C 70/56* (2013.01); *D04B 1/102* (2013.01); *D04B 1/22* (2013.01); *D04B 15/66* (2013.01); *D04B 37/02* (2013.01); *D06B 1/10* (2013.01); *D06M 15/41* (2013.01); *D06M 15/507* (2013.01); *D06M 15/55* (2013.01); *D06M 15/564* (2013.01); *D06M 15/59* (2013.01); *D06M 15/70* (2013.01); *B29K 2063/00* (2013.01); *B29K 2105/0836* (2013.01); *B29K 2709/08* (2013.01); *B29K 2995/0077* (2013.01); *B29K 2995/0087* (2013.01); *D06M 2101/20* (2013.01); *D06M 2101/36* (2013.01); *D06M 2101/40* (2013.01); *D10B 2505/02* (2013.01)

(56) References Cited

U.S. PATENT DOCUMENTS

| | | | | |
|---|---|---|---|---|
| 4,923,724 | A | | 5/1990 | Day et al. |
| 5,209,969 | A | * | 5/1993 | Crowther .................. B32B 7/12 |
| | | | | 428/317.5 |
| 5,244,716 | A | * | 9/1993 | Thornton .................. B32B 5/18 |
| | | | | 428/198 |
| 5,429,693 | A | | 7/1995 | Rose |
| 5,907,014 | A | | 5/1999 | Quint |
| 8,745,896 | B2 | | 6/2014 | Dua et al. |
| 8,800,172 | B2 | | 8/2014 | Dua et al. |

OTHER PUBLICATIONS

GJ Dvorak, AP Suvorov, "The effect of fibre pre-stress on residual stresses and the onset of damage in symmetric laminates", Composites Science and Technology, 60, 2000, 1129-1139.

LDA Jorge, AT Marques, PMST De Castro, "The influence of prestressing on the mechanical behaviour of uni-directional composites", Developments in the science and Technology of the composite materials, Elsevier Applied Science, London and New York, 1990, 897-902.

DH Rose, JM Whitney, "Effect of prestressed fibres upon the response of composite materials", Proceedings of American Society of Composites, 8th Technical conference on composites, Lancaster, PA, 1993, 489-498.

GX Sui, G Yao, BL Zhao, "Influence of artificial pre-stressing during the curing of VIRALL on its mechanical properties". Composite Science and Technology, 53, 1995, 361-364.

ME Tuttle, RT Koehler and D Keren, "Controlled thermal stresses in composites by means of fibre prestress", Journal of Composite Materials, 30(4), 1996, 486-502.

S Motahhari, J Cameron, "Measurement of micro-residual stresses in fibre pre-stressed composites", Journal of Reinforced Plastics and Composites, 16 (12), 1997, 1129-1137.

S Motahhari, J Cameron, "Impact strength of fibre pre-stressed composites", Journal of Reinforced Plastics and Composites, 17 (2), 1998, 123-130.

J Zhao, J Cameron, "Polypropylene matrix composites reinforced with pre-stressed glass fibres", Polymer Composites, 19 (3), 1998, 218-224.

AS Hadi and JN Ashton, "On the influence of pre-stress on the mechanical properties of a unidirectional GRE composite", Composite Structures, 40(3-4), 1998, 305-311.

S Motahhari, J Cameron, "Fibre prestressed composites: improvement of flexural properties through fibre prestressing", Journal of Reinforced Plastics and Composites, 18 (3), 1999, 279-288.

M.E. Tuttle, "A Mechanical/Thermal Analysis of Prestressed Composite Laminates" Journal of Composite Materials 1988 22: 780.

Siamak Motahhari, "Fibre Prestressed Composites" Thesis, Queen's University Kingston, Ontario, Canada, Mar. 1998.

Krishnamurthy, S. <https://dspace.lib.cranfield.ac.uk/browse?type=author&value=Krishnamurthy%2C+S.> "Pre-stressed advanced fibre reinforced composites fabrication and mechanical performance", Thesis, Cranfield University Feb. 2006.

Ahlquist,S. & Menges, A. "Frameworks for Computational Design of Textile Micro-Architectures and Material Behavior in Forming Complex Force-Active Structures," Adaptive Architecture, Acadia, 2013.

Basu, S. et al.. "Prediction of Progressive Failure in Multidirectional Composite Laminated Panels," International Journal of Solids and Structures, 44, 2013, pp. 2648-2676.

Hufenbach, W. et al.. "Polypropylene/glass fibre 3D-Textile Reinforced Composites for Automotive Applications," Materials and Design, 32, 2011, pp. 1468-1476.

Essl, G. et al.. "Computation of Wave Fronts on a Disk I: Numerical Experiments," Electronic Notes in Theoretical Computer Sciences, 161, 2006, pp. 25-41.

Cebulla H. et al., "Fully Fashioned Biaxial Weft Knitted Fabrics," AUTEX Research Journal, vol. 2, No. 1., 2002, pp. 8-13. Accessed on Apr. 17, 2017 at http://www.p.lodz.pl/autexrj/No3/0004.pdf.

Adounaim, Md. et al., "Thermoplastic Composite from Innovative Flat Knitted 3D Multi-layer Spacer Fabric Using Hybrid Yarn and the Study of 2D Mechanical Properties," Composite Science and Technology, 70, 2010, pp. 363-370.

MP Jevons, GF Fernando, and GS Kalsi, "Effect of pre-tensioning on the low velocity impact performance of glass fibre composites," Tenth European conference on composite materials (ECCM-10), Jun. 3-7, 2002, Brugge, Belgium.

Luminita Ciobanu, "Development of 3D Knitted Fabrics for Advanced Composite Materials," Advances in Composite Materials—EcoDesign and Analysis, pp. 161-195 (2011).

\* cited by examiner

METHODS TO INCREASE STRUCTURAL PERFORMANCE, STRENGTH AND DURABILITY OF FABRIC-REINFORCED COMPOSITE MATERIALS BY PRE-STRESSING

CROSS-REFERENCE TO RELATED APPLICATIONS

This application is a continuation of U.S. patent application Ser. No. 14/854,175 filed on Sep. 15, 2015 which issued as U.S. Pat. No. 10,576,670 and claims the benefit of U.S. Provisional Application No. 62/050,527 filed on Sep. 15, 2014. The entire disclosures of the above applications are incorporated herein by reference in their entirety.

FIELD

The present disclosure relates to methods to increase structural performance, strength, and durability of fiber-reinforced composite materials. More particularly, the present disclosure relates to textile or fabric-reinforced composite material subjected to pre-stressing to provide increased structural performance, strength, and durability.

BACKGROUND

This section provides background information related to the present disclosure which is not necessarily prior art.

Structural performance, strength, and durability are important for materials used in load-carrying structures. Load-carrying structures may be used in a variety of applications, including in the transportation industries, medical industry, and construction and manufacturing industries, by way of non-limiting example. Such structures typically need to be capable of load bearing and supporting the weight of other components, structures, equipment, cargo, and the like. While metals perform well as load-carrying structures for many applications, they have a distinct disadvantage in being heavy. Thus, use of structural components formed of metals can reduce efficiency and fuel economy for vehicles, like automobiles, airplanes, and boats.

Composite materials have a resin matrix and at least one reinforcement material dispersed within the resin matrix (e.g., a plurality of fibers or particles). Fiber reinforced composite materials are lightweight and have been considered as alternative load-carrying structures and components. In recent years, a trend has been developing in the composites industry to incorporate more woven textile and knitted composites as the reinforcement material. However, the laying up of unidirectional fibers is an expensive and cumbersome procedure, one requiring specialized equipment and skilled labor.

Further, conventional composite materials have not exhibited the necessary robustness for long-term use in many applications, as they may not exhibit necessary durability and strength over time or may have limited ductility (e.g., high brittleness). Complex three-dimensional structures formed of conventional fiber-reinforced composites are usually formed of multiple pieces of the composite material. Structures formed from conventional fiber-reinforced materials thus have seams and joints that are susceptible to failure during long-term use (as they can introduce weak portions into the structure). Thus, improvements in designs of structures formed of composite materials, to provide necessary strength, durability, and toughness for various applications would be highly desirable to improve long-term durability of such lightweight structures.

SUMMARY

This section provides a general summary of the disclosure and is not a comprehensive disclosure of its full scope or all of its features.

In certain aspects, the present disclosure provides methods of making a composite article. The method may comprise pre-stressing a textile reinforcement preform by applying tension thereto. A polymeric precursor may be introduced to the pre-stressed textile reinforcement preform. The polymeric precursor may then be cured, followed by releasing of the applied tension to form the composite article comprising a cured polymer and the pre-stressed textile reinforcement. In other variations, a polymeric precursor may be introduced into the textile reinforcement preform, which is then pre-stressed. This is followed by consolidation of the polymeric precursor to form the composite article comprising a consolidated polymer and the pre-stressed textile reinforcement.

In other variations, the present disclosure provides a composite article that comprises a pre-stressed seamless knitted reinforcement structure and a cured or consolidated polymer.

In yet other variations, the present disclosure provides a composite article comprising a pre-stressed seamless knitted reinforcement structure. The knitted reinforcement structure comprises a first knitted region having a first pre-stress level and a distinct second knitted region having a second pre-stress level greater than the first pre-stress level. The composite article also comprises a cured thermoset polymer. In other variations, the composite article comprises a consolidated thermoplastic polymer.

In yet other aspects, the present disclosure provides a method of making a composite article comprising introducing a polymeric precursor into a textile reinforcement preform. The method includes pre-stressing the textile reinforcement preform comprising the polymeric precursor by applying tension thereto. The polymeric precursor may be consolidated by applying heat, pressure, or heat and pressure. Next, the applied tension is released to form the composite article comprising a consolidated polymer and the pre-stressed textile reinforcement.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1B are schematics showing control of knit density of knitted fiber reinforcements formed in accordance with the present disclosure. FIG. 1A has a first preselected stitch or knit density and FIG. 1B has a second preselected stitch or knit density. The first preselected knit density in FIG. 1A is lower than the second preselected knit density in FIG. 1B.

FIGS. 2A-2C show a series of schematics where uniaxial tension is applied to a knitted reinforcement textile ply followed by clamping its edges and curing a resin under tension. FIG. 2A shows a dry lay-up ply (or plies) prior to any tension being applied. FIG. 2B shows uniaxial tension being applied to the lay-up ply in FIG. 2A. After uniaxial tension is applied, resin is introduced to the lay-up ply. FIG. 2C shows clamping of the edges while the uniaxial tension remains and the resin is present, so that the resin in the lay-up ply can be cured under tension.

FIG. 3 shows a test set up for testing and measuring uniaxial tension.

FIGS. 4A-4E are various views of knitted glass textiles. FIG. 4A is a schematic of the knitted glass textile, and FIG. 4B is a close-up photograph of the same knit structure showing dimensions of 6 mm×6 mm in the arrows. FIG. 4C shows a schematic of a knitted glass textile having a knit density of 8 loops/inch, while FIG. 4D has a knit density of 7 loops/inch. FIG. 4E is an enlarged portion of the stitch pattern in FIG. 4D.

Figures 7A, 7B, 7C, 7D:
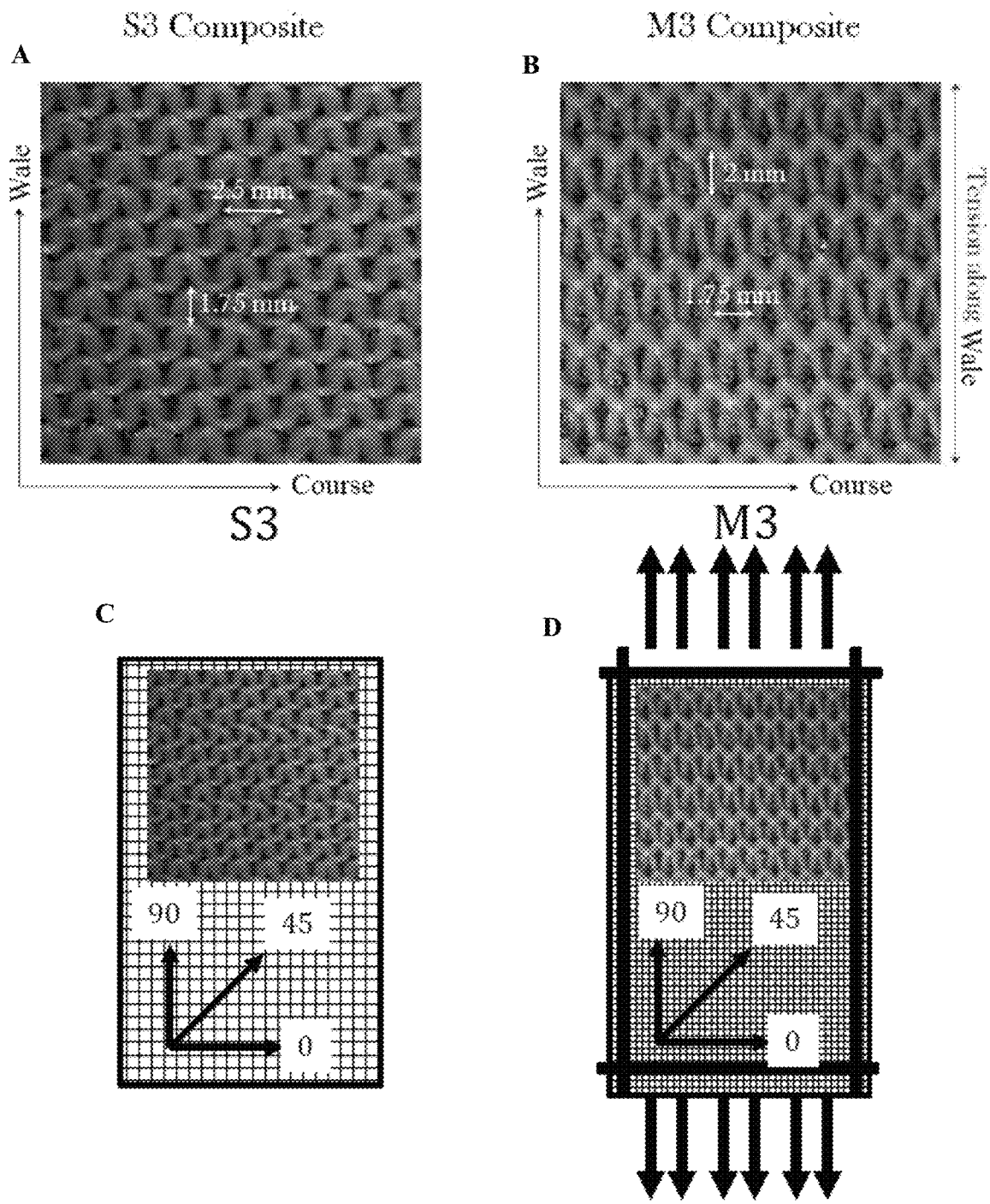

FIGS. 7A-7D. FIG. 7A shows a photograph of S3 knitted KEVLAR™ fiber panel, while 7B shows a photograph of M3 knitted KEVLAR™ fiber panel. FIG. 7C shows a schematic of the S3 knitted KEVLAR™ fiber panel with the 0°, 45°, and 90° directions and an inset of a photograph of the S3 panel, while FIG. 7D shows a schematic and inset photograph of the M3 knitted KEVLAR™ fiber panel with the 0°, 45°, and 90° directions.

Figure 8:
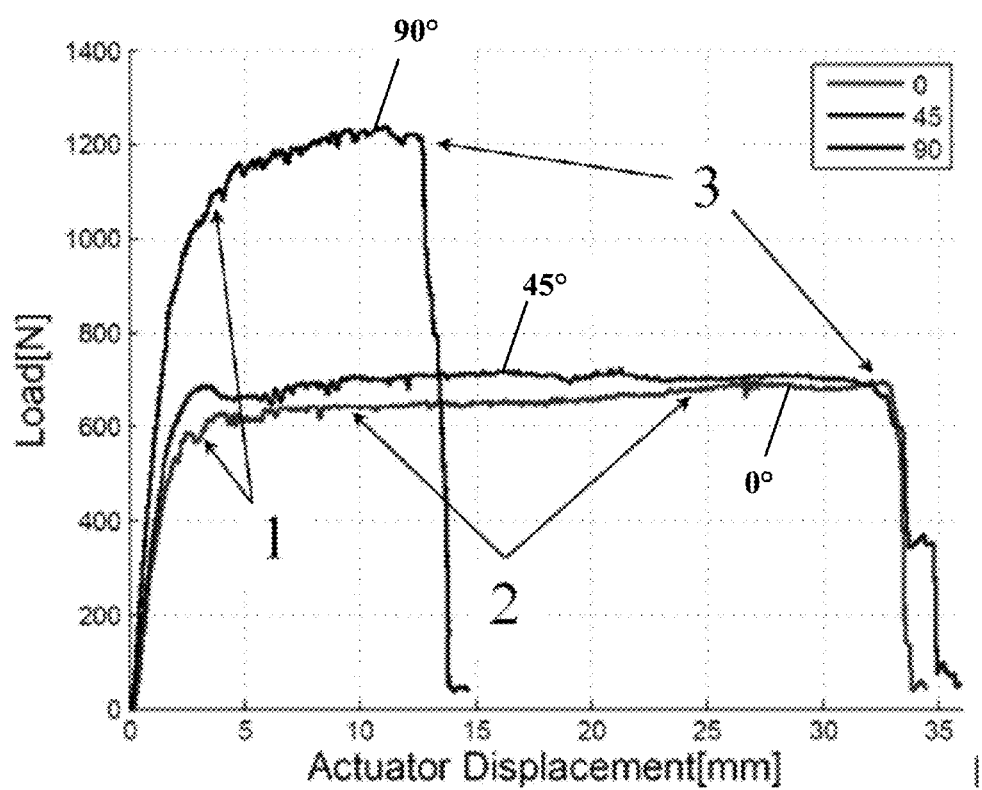

FIG. 8 shows typical load-displacement curves for the S3 knitted KEVLAR™ fiber panel composite observed in each of the 0°, 45°, and 90° directions.

Figures 9A, 9B, 9C:
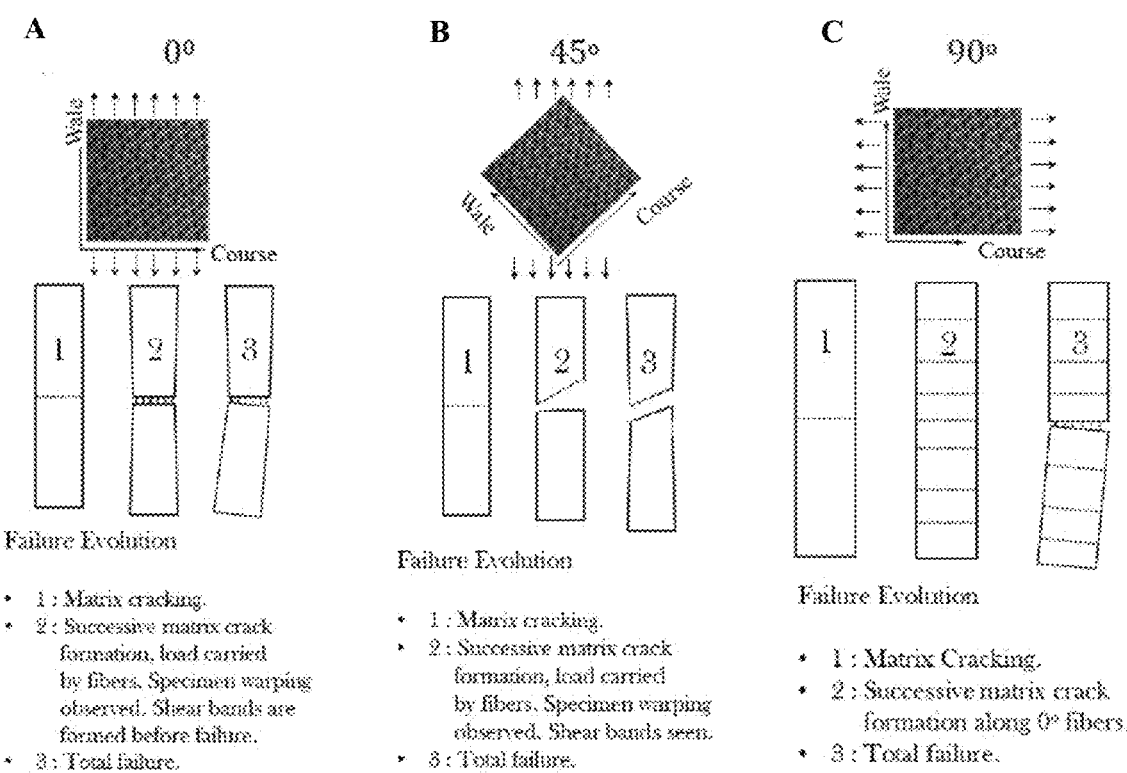

FIGS. 9A-9C show typical load-displacement curves for the S3 knitted KEVLAR™ fiber panel composite observed in each of the 0° (FIG. 9A), 45° (FIG. 9B), and 90° (FIG. 9C) directions.

Figure 10:
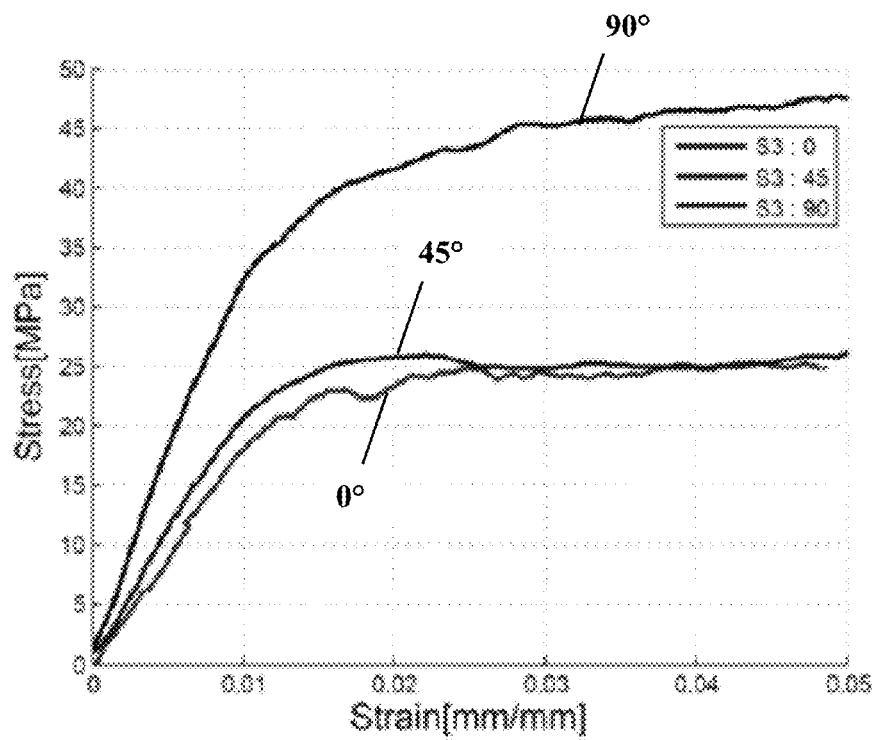

FIG. 10 shows a stress-strain curve for S3 knitted KEVLAR™ fiber panel composite.

Figure 11:
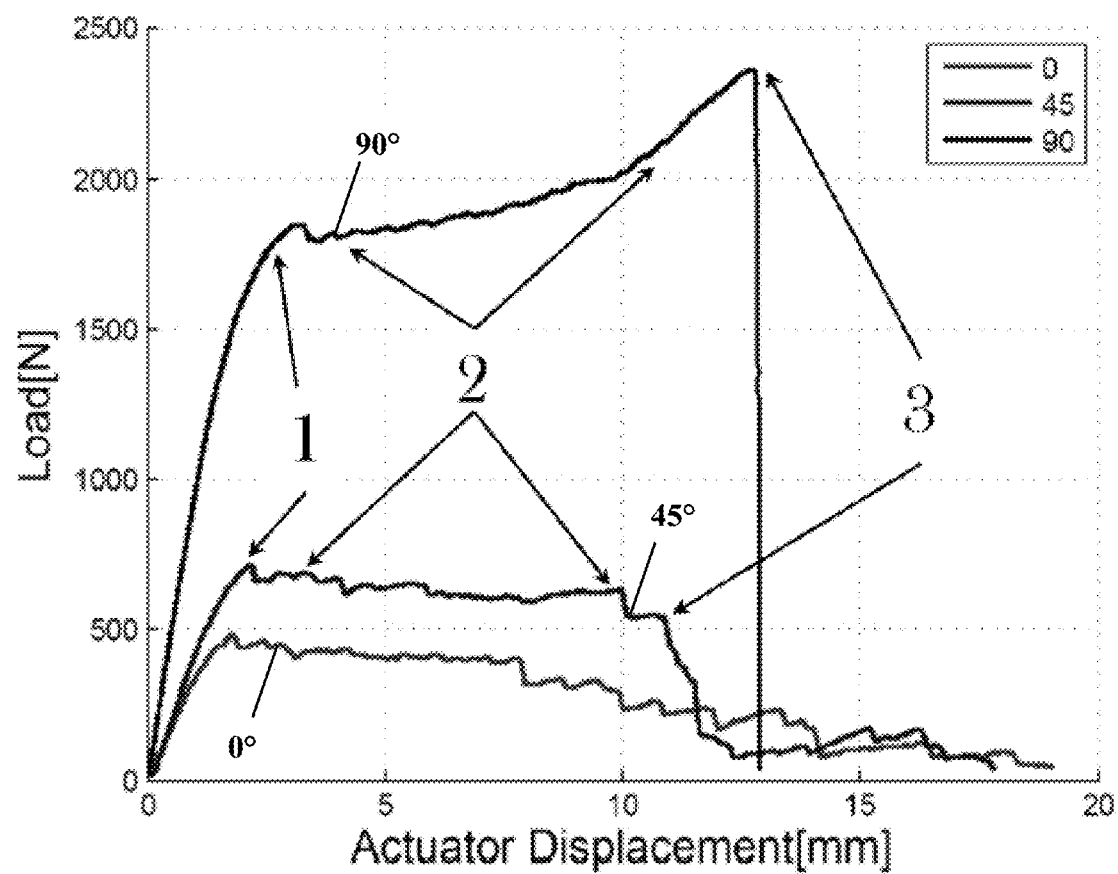

FIG. 11 shows typical load displacement in each of directions 0°, 45°, and 90° for a M3 knitted KEVLAR™ fiber panel.

Figures 12A, 12B, 12C:
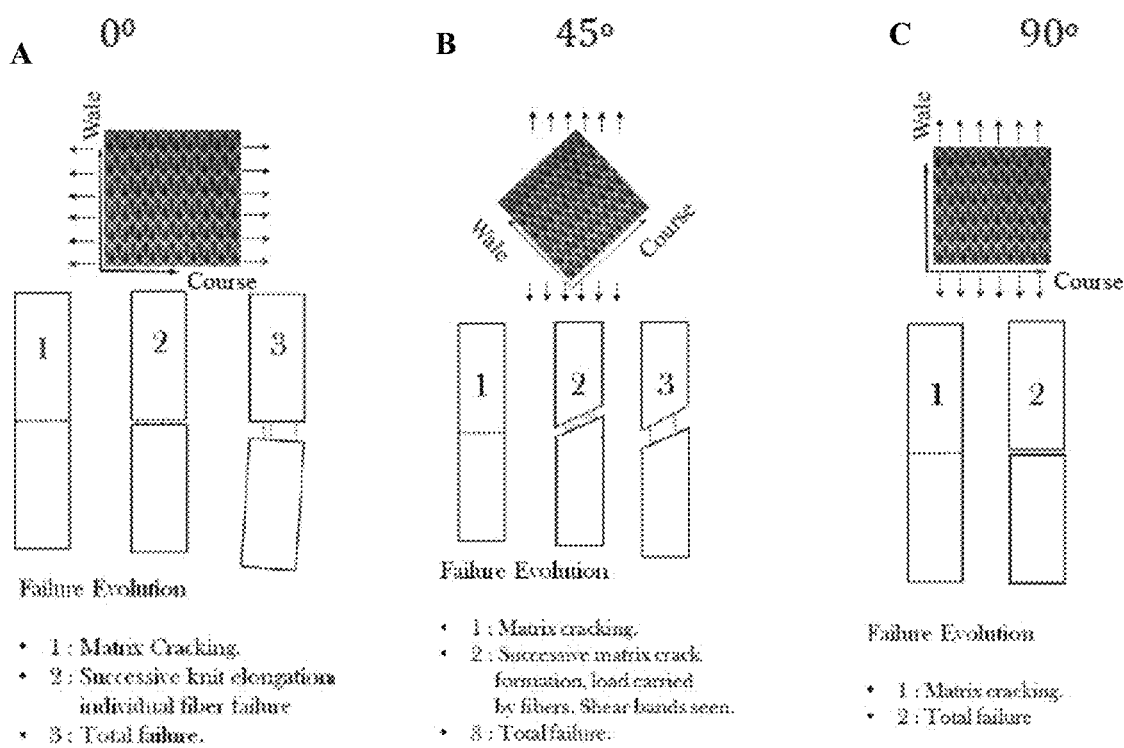

FIGS. 12A-12C show typical load-displacement curves observed for M3 knitted KEVLAR™ fiber panel in each of the 0° (FIG. 12A), 45° (FIG. 12B), and 90° (FIG. 12C) directions.

Figure 13:
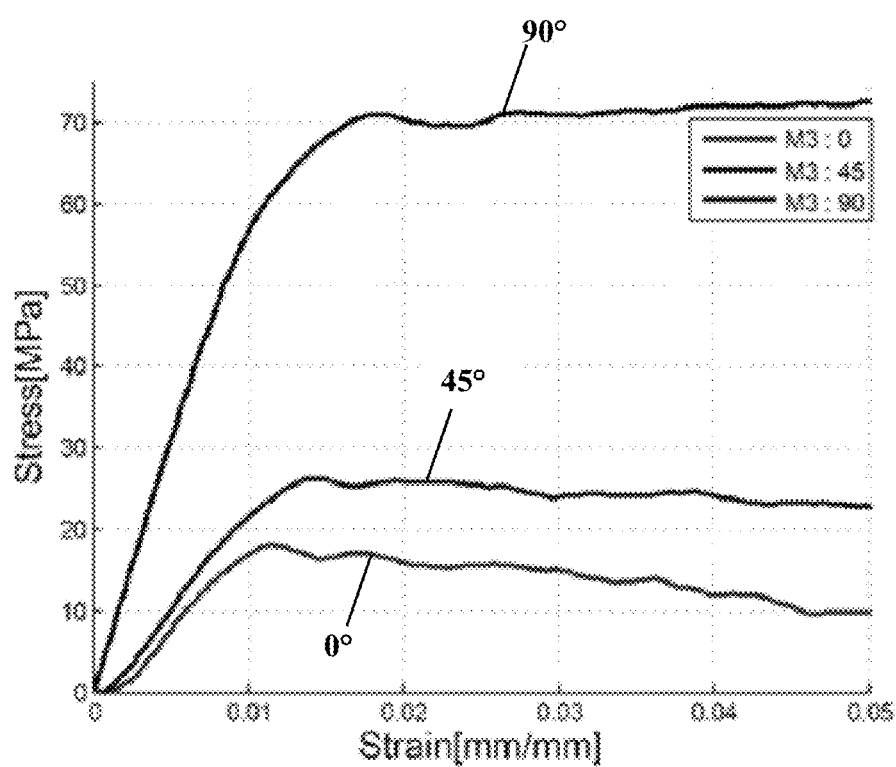

FIG. 13 shows a stress-strain curve for M3 knitted KEVLAR™ fiber panel composite.

Figures 14A, 14B, 14C, 14D:
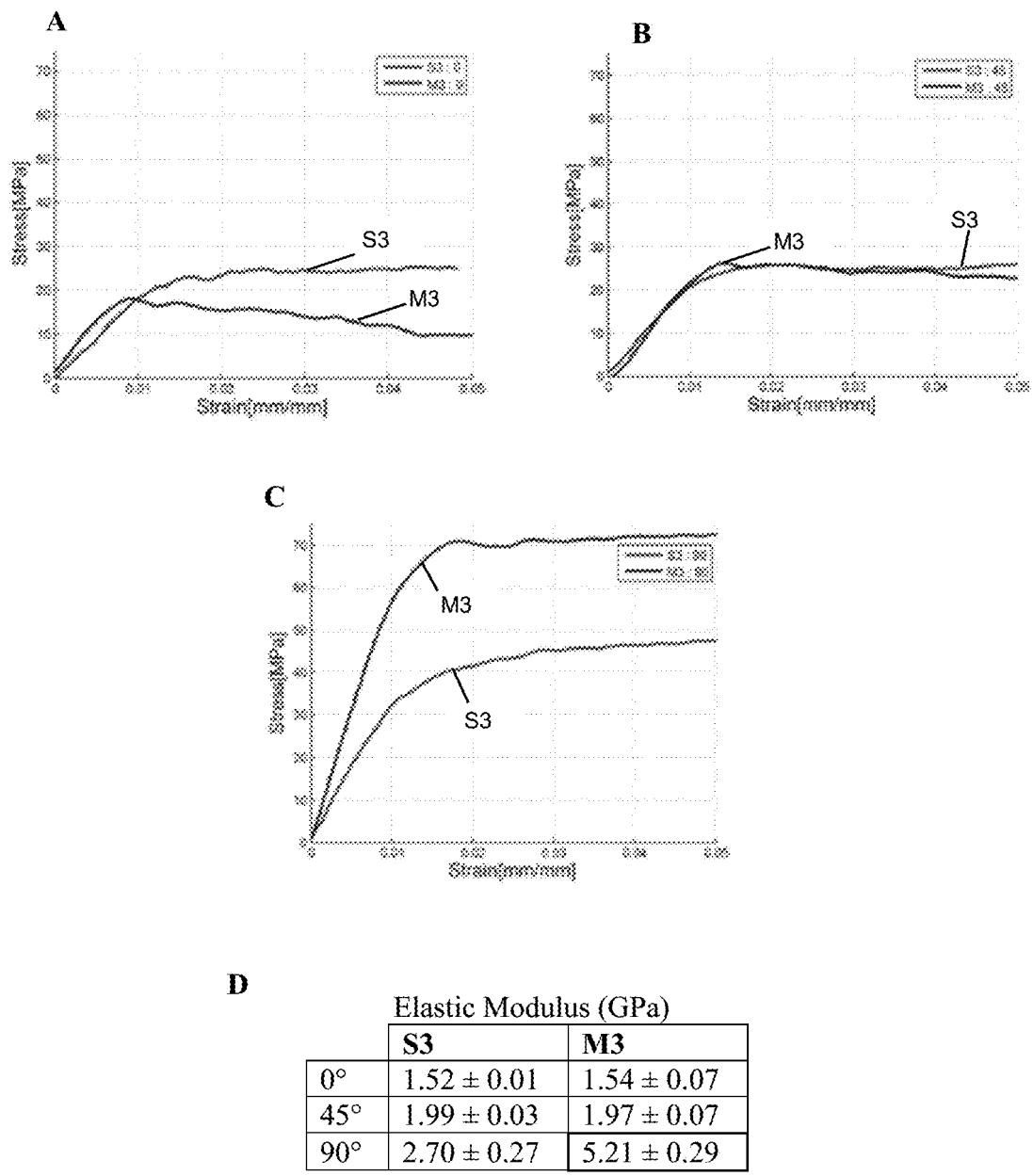

FIGS. 14A-14D show a comparison of stress-strain curves, S3 versus M3 knitted KEVLAR™ composites. FIG. 14A shows stress-strain curves comparing S3 and M3 panels at 0°. FIG. 14B shows stress-strain curves comparing S3 and M3 panels at 45°. FIG. 14C shows stress-strain curves comparing S3 and M3 panels at 90°. FIG. 14D is a table showing comparative elastic moduli for S3 and M3.

Figures 15A, 15B, 15C, 15D:
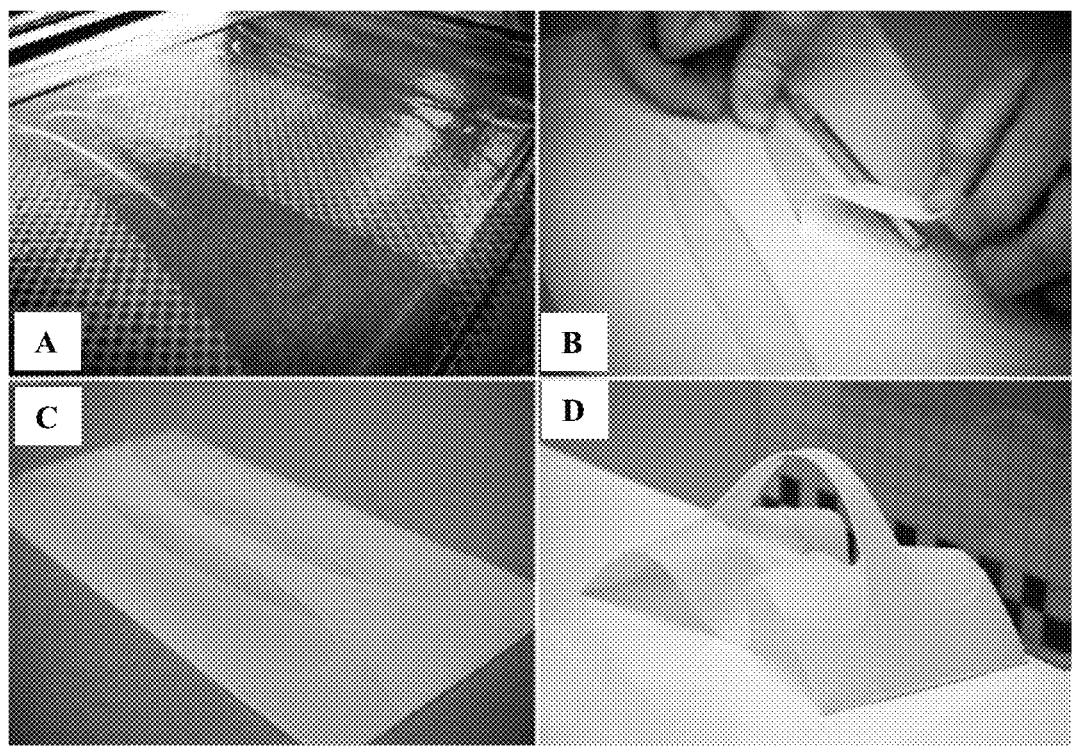

FIGS. 15A-15D show a prototype of a formation process for one embodiment of a pre-stressed knit reinforced composite (pKRC) forming method according to certain variations of the present disclosure. FIG. 15A shows a multi-layer composition of textiles flat-formed as a differentiated composite, using vacuum impregnation of an epoxy resin. FIG. 15B shows an integrated pre-stressed textile that is activated when the masking is removed (shown in FIG. 15C). In FIG. 15D, a flat sheet is transformed into a 3D structure.

Figures 16A, 16B:
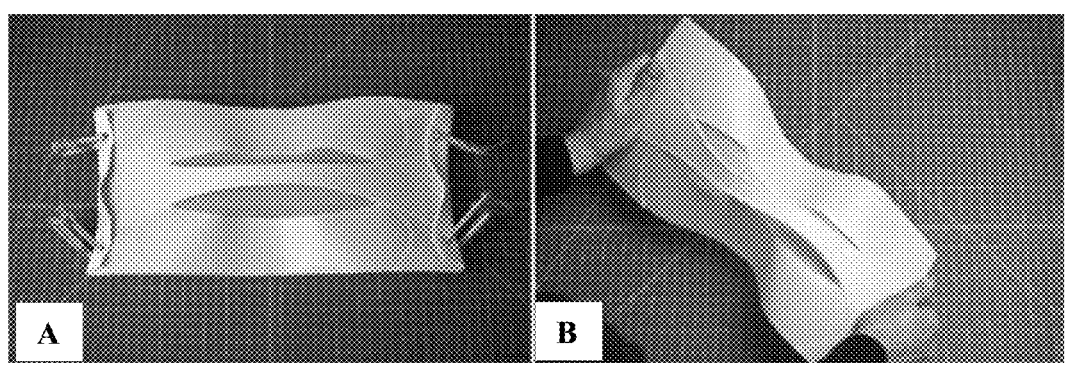

FIGS. 16A-16B show methods of stressing a prototype that retains curvature due to an epoxy matrix being allowed to cure in a "re-bounded" 3D state. FIG. 16A shows that where the same linear tension force is applied as in the pre-stressed textile, the part does not return to its initial flat state. FIG. 16B shows application of torsion by hand demonstrates the ductility and transformational possibilities of the prototype.

Figures 17A, 17B, 17C, 17D:
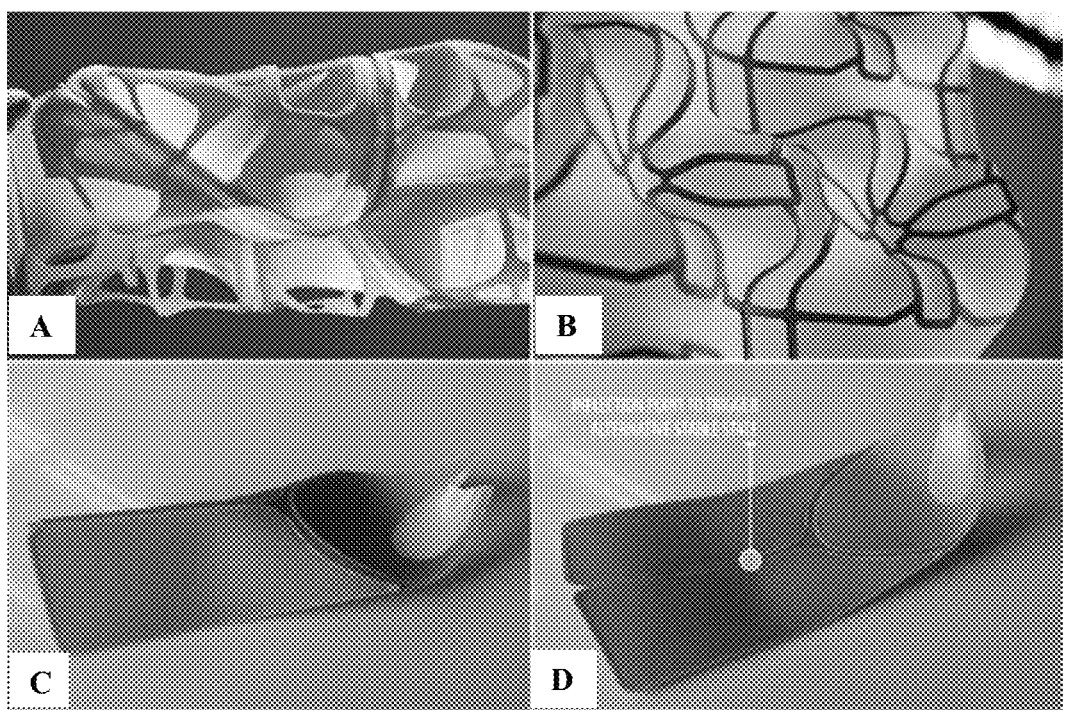

FIGS. 17A-17D show prototypes of embodiments of pKRC materials according to certain aspects of the present disclosure that are post-formed from a flat-bed vacuum process. FIG. 17A shows highly deformed composite webbing with integrated textile, which forms into doubly curved surfaces. FIG. 17B shows utilization of narrow strips of micro-thin wood veneer (1/64 inch width) laminated with epoxy to pre-stressed polyester/Spandex textile. FIGS. 17C-17D show a differentiated composite, which exhibits both a folded (FIG. 17C) and semi-flat (FIG. 17D) bi-stable configuration.

Figure 18:
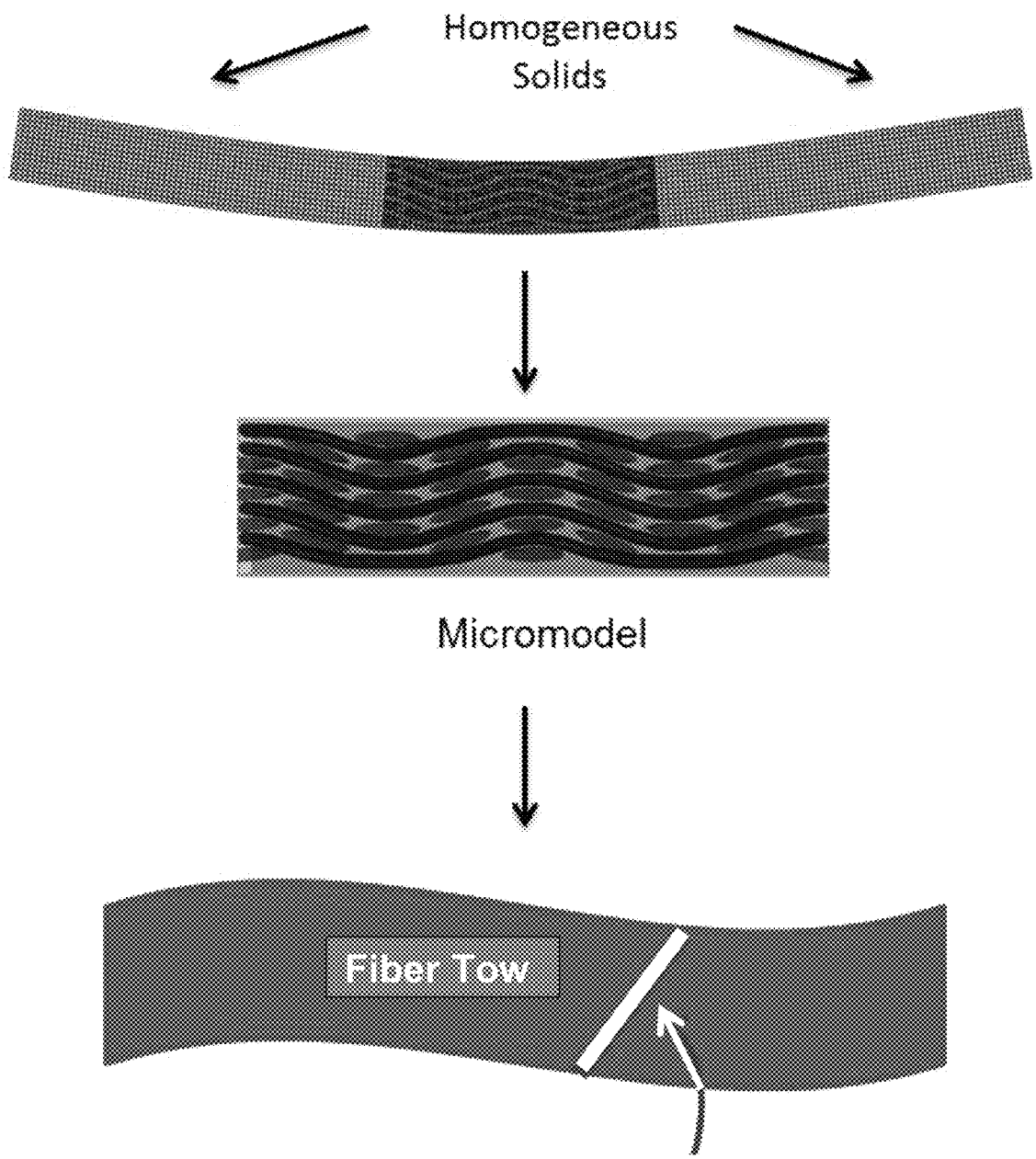

FIG. 18 shows a description of a global-local modeling method utilized for FE based simulation of pKRC material properties according to certain aspects of the present disclosure.

Figures 19A, 19B, 19C, 19D:
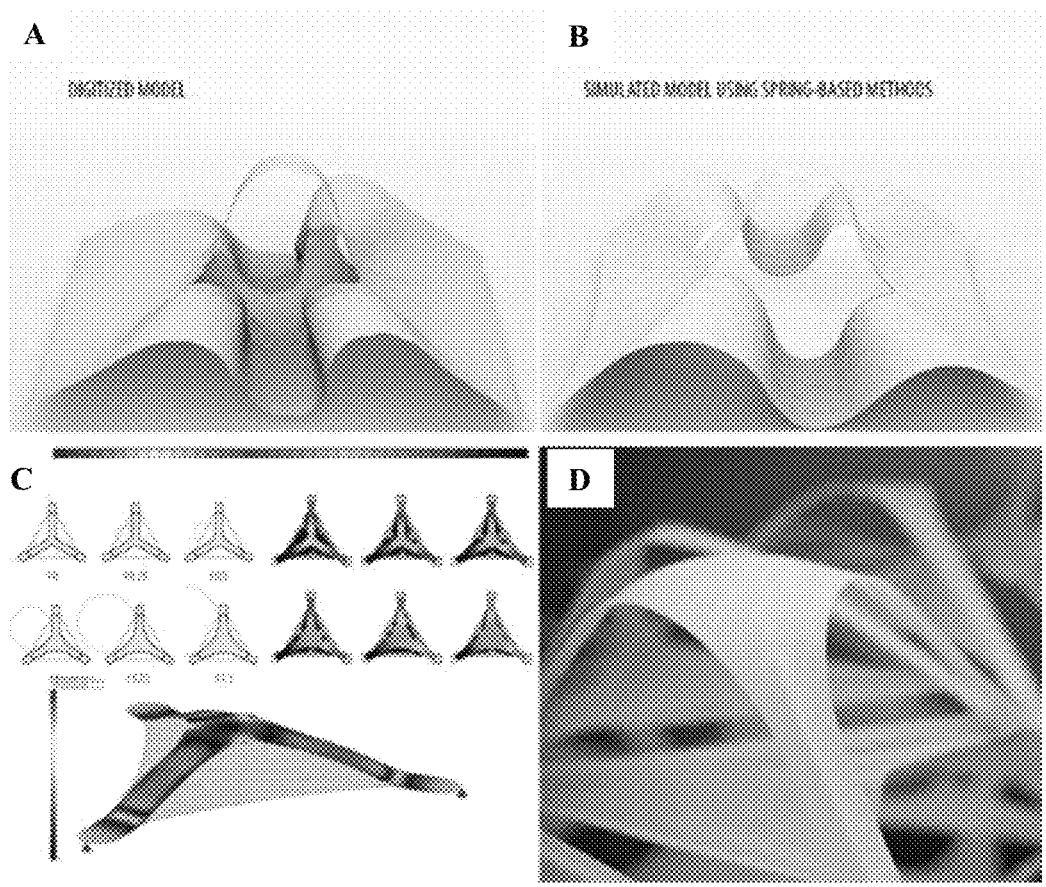

FIGS. 19A-19D show a model of form-finding of post-formed geometries based on simulating stiffnesses and pre-stress in spring-based methods (FIGS. 19A-19B) and finite element analysis (FEA) (FIGS. 19C-19D).

Figures 20A, 20B:
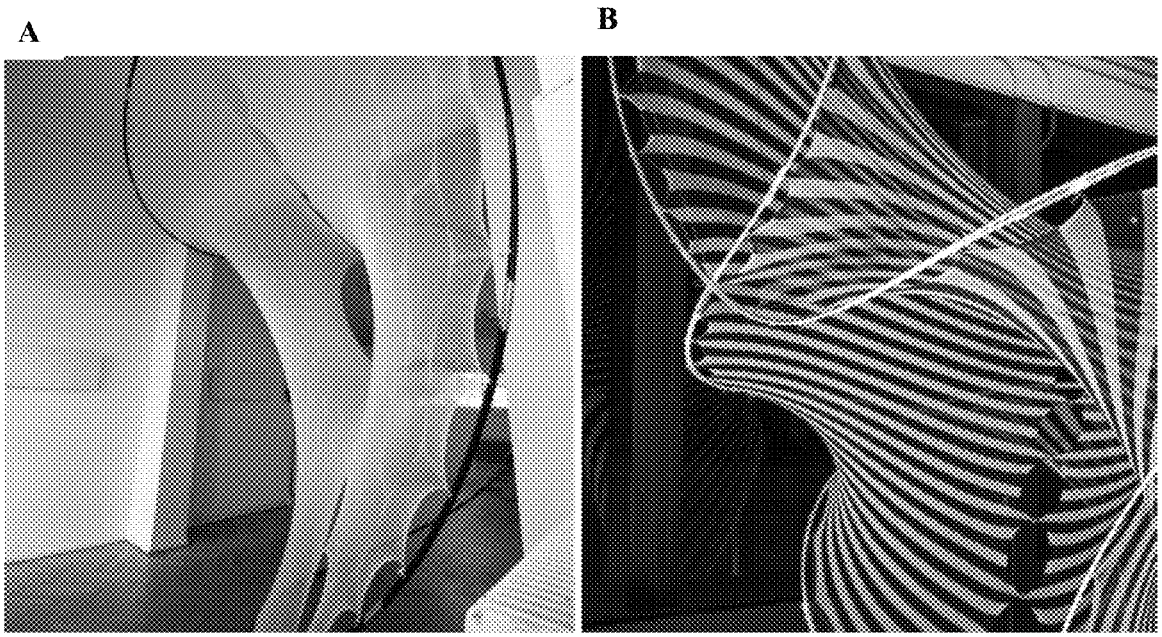

FIGS. 20A-20B show two different prototypes of weft-knitted textiles as part of complex pre-stressed tent-like structures.

Figures 21A, 21B:
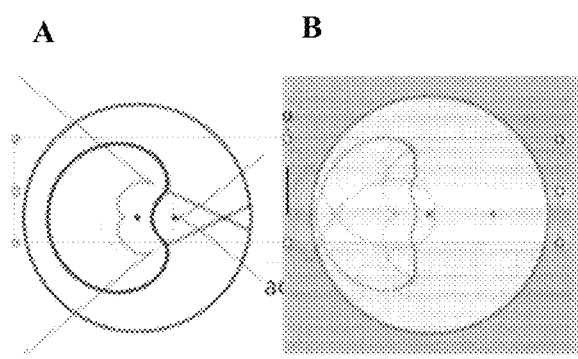

FIGS. 21A-21B show comparative simulations of propagation between homogenous knit (in FIG. 21A) and differentiated knit (in FIG. 21B).

FIGS. 22A-22D show schematics of different exemplary variations of distinct stitch patterns in a knitted reinforcement textile formed from a computer numerical control (CNC) flat bed weft knitting machine.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

Knitted textiles have great potential for use in structural composites, as well as in other applications, such as medical implants and scaffolds for tissue engineering. In certain aspects, the present disclosure contemplates a composite article that comprises a lightweight reinforcement structure and a cured resin. In accordance with certain aspects of the present disclosure, the fabric or textile reinforcement structure is pre-stressed by applying tension, as will be discussed further herein. The lightweight reinforcement structure may be a fabric or textile reinforcement. In certain aspects, a fabric encompasses both a woven structure formed of a fiber, filament, or yarn (e.g., having woven warp and weft strands) and a knitted structure (e.g., having interlocking loops of one or more strands) formed of a fiber, filament, or yarn (referred to herein as a fiber). In certain aspects, the reinforcement structure is a knitted fabric or textile. Knitted structures are particularly advantageous in that they can form strong, unitary and seamless complex three-dimensional structures. In other aspects, the fabric or textile reinforcement structure is anisotropic.

Thus, the reinforcement structure for a composite in accordance with certain aspects of the present disclosure may be formed of a unitary knit construction, meaning that the component is formed as a single piece seamless element in a knitting process. The knitting process is capable of forming the various shapes, structures, and features of unitary knit construction with minimal or no additional manufacturing steps or processes. A unitary seamless knit construction may be used to form a knitted component having structures or elements that include one or more courses of yarn or other knit materials that are joined such that the shapes, structures, or elements share at least one course in common (e.g., sharing a common yarn) or include courses that are substantially continuous between each of the shapes, structures, or elements. With this arrangement, a one-piece element of unitary knit construction is provided.

A knitted reinforcement material can be formed from at least one yarn that is processed (e.g., in a knitting machine) to form a plurality of intermeshed loops that define a knit piece or structure including courses and wales. Thus, in certain variations, the adjacent areas of the knit piece share at least one common course or at least one common wale. The knit piece can have the structure of a knit textile. Knit reinforcement structural pieces can be formed via weft knitting operations, warp knitting operations, flat knitting operations, circular knitting operations, or other suitable methods.

In certain aspects, the knitted reinforcement structural piece may be formed on a computer numerical control (CNC) knitting machine, such as a CNC flat bed weft knitting machine. Such knitting machines have automation with advanced CNC machinery and highly articulated degrees of customization in fiber directionality and densities. One particularly suitable CNC weft-knitting machine is a CMS 822™ (82 inch needle bed) multi-gauge knitting machine sold by Stoll. Such CNC knitting machines allow for variability across the type of fibers used during a single knitting process and regulation (tension) of the fibers as they are knitted, producing differentiated conditions amounting to different levels of pre-stress in the overall textile or fabric. The gross topology of the formed textile is highly variable as well, where machines of multiple knitting rows permit complex topologies of intersecting tubes and volumes to be formed of completely continuous knit structures with minimal anomalous conditions.

Pre-stressed knitted textiles are particularly advantageous when used as reinforcements in structural composites, for various applications. In this way, new methods of manufacturing fiber reinforced composites are contemplated that increase mechanical performance of composites, such as modulus, strength, durability and fatigue life. In certain aspects, the present disclosure provides methods of making a composite article. Such a method may include pre-stressing a preform of a textile reinforcement by applying tension thereto. Tension may be applied by pulling regions of the preform, thus amounting to pre-stress on the reinforcement material. Suitable non-limiting tension levels may be greater than or equal to zero up to about half the maximum tensile strength of the preform in certain variations. As appreciated by those of skill in the art, different preforms may have different tensile strengths.

Traditional composite manufacturing methods do not typically subject the dry preform having a reinforcement material (prior to introducing any resin) to tension. Conventionally, resin is first added to reinforcement material, and then tension may be applied for the curing process.

The method may further comprise forming a preform of the textile reinforcement prior to the pre-stressing step. The forming may include knitting the preform of the textile reinforcement into a unitary seamless structure. In certain variations, such a knitting process may be conducted on a computer numerical control (CNC) flat bed weft knitting machine. The CNC knitting machines, including flat bed weft knitting machines, provide the capability to modify properties of the knitted textile in different regions of the same unitary seamless knitted structure, whether by substituting different fibers or yarns or modifying the knitting or stitch pattern type, stitch density, stitch length, yarn tension, and the like.

Figures 22A, 22B, 22C, 22D:
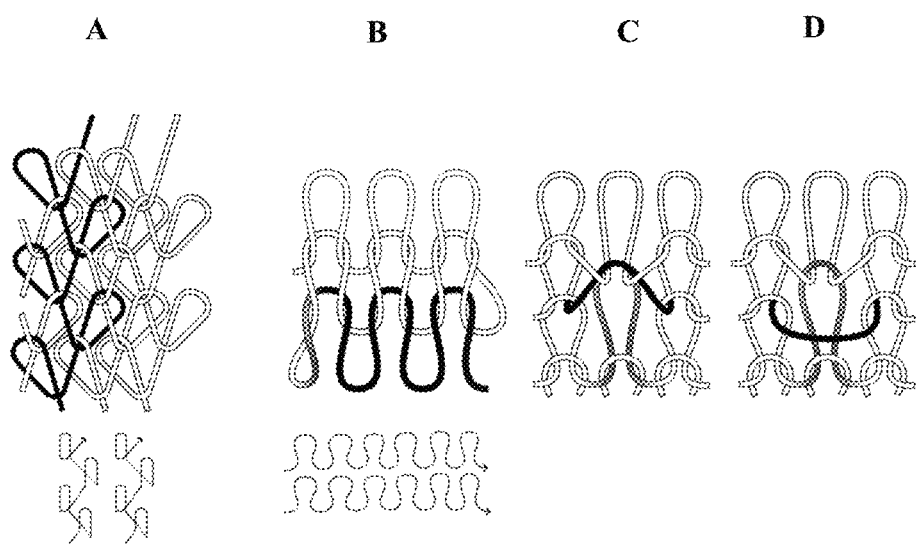

By way of non-limiting example, FIGS. 22A-22D show schematics of different exemplary variations of distinct stitch patterns in a knitted reinforcement textile formed from a computer numerical control (CNC) flat bed weft knitting machine. The stitch length and stitch spacing may be variable and can be preselected parameters for specific applications. In FIG. 22A, a dual interlocking stitch pattern of high stitch density is shown as reference, made in a warp knitting machine. In FIG. 22B, a regular single jersey knit structure is indicated. FIGS. 22C and 22D each show different variations of patterns utilizing tuck and float techniques to manipulate stitch structure, where a middle column of stitches has a longer stitch length than the adjacent columns (where stitch length is shorter). By modifying these properties, the rigidity and flexibility can vary in a controlled manner.

Thus, in certain aspects, the knitting forms a first knitted region and a distinct second knitted region in the preform of the reinforcement fabric or textile. The first knitted region is distinct from the second knitted region. As appreciated by those of skill in the art, the reinforcement textile may have a plurality of distinct knitted regions and is not limited to merely two different regions. The ability to have distinct regions with different properties within a unitary seamless structure is unique to knitted materials.

The knitted reinforcement structural piece may incorporate various types and combinations of stitches and yarns. With regard to stitches, the yarn forming the knitted reinforcement structural piece may have one type of stitch in one area and another type of stitch in another area of the knit reinforcement piece. Depending upon the types and combinations of stitches employed, areas of the knit reinforcement piece may have a plain knit structure, a mesh knit structure, or a rib knit structure, for example. The different types of stitches may affect the physical properties of knitted reinforcement structural piece, including levels of pre-stress, rigidity, flexibility, strength, aesthetics, stretch, thickness, air permeability, and abrasion-resistance. That is, the different types of stitches may impart different properties to different areas of the knit reinforcement piece.

The knit reinforcement piece may have one type of yarn in one area and another type of yarn in another area of the knit reinforcement piece. Depending upon various design criteria, the knit reinforcement piece may incorporate different yarn materials, including distinct compositions, denier, thickness, weight or ply, and/or degrees of twist, by way of non-limiting example. The different types of yarns used within a single knitted piece may affect the physical properties of knit reinforcement piece, including levels of pre-stress, rigidity, flexibility, strength, aesthetics, stretch, thickness, air permeability, and abrasion-resistance in distinct areas. By combining different types and combinations of stitches and yarns, each area of knitted reinforcement structural piece may have specific predetermined (mechanical) properties. In certain aspects, the first knitted region and the second knitted region vary from one another by at least one property selected from the group consisting of: stitch pattern, stitch density, stitch length, stitch spacing, yarn composition, yarn thickness, yarn denier, yarn weight, yarn ply, yarn degree of twist, rigidity, flexibility, and combinations thereof. These parameters influence the mechanical properties of the final structural composite component. In certain aspects, the impact of such properties (e.g., influences) are obtained by conducting finite element computational models of the structural component to be manufactured, where the finite element model incorporates details of one or more of these respective parameters.

When tension is applied to the preform, it travels through the reinforcement structure and is distributed in different ways in the distinct knitted regions. Thus, based on the differences between them, a first knitted region experiences a different level of pre-stress than the second knitted region, thus providing the ability to selectively control pre-stress levels within the preform. Further, the shapes of the solid structural composite may be altered and controlled by the different levels of stress applied by tension, including during the curing process discussed in more detail below. Therefore, the ability to selectively control pre-stress to different levels within the preform when the same amount of tension is applied is a particular advantage of using a knitted textile having distinct knitted regions. The present methods thus provide the ability to provide highly customized composite materials.

Next, a polymeric precursor is introduced to the pre-stressed textile reinforcement preform. By introducing, it is meant that the polymeric precursor may be applied to or within the preform. In certain variations, the polymeric precursor is in a liquid form (and may be provided in a carrier or solvent). The polymeric precursor may partially or fully fill the openings within in the fabric. The introducing may include infusing, vacuum impregnation, injecting, jetting, spraying, spreading, or otherwise distributing onto a surface of the preform. In certain variations, the introducing of the polymeric precursor is to the entire surface of the pre-stressed textile reinforcement preform. In another variation, however, the introducing of the polymeric precursor is only to select regions of the pre-stressed textile reinforcement preform, leaving regions of the preform uncoated and lacking any precursor. In such a variation, the select regions may be contiguous or non-contiguous.

The polymeric precursor is then cured. By curing, it is meant that the precursor undergoes a reaction, such as cross-linking to form a polymer. The curing process may be induced by exposure to heat, pressure, actinic radiation, e-beam energy, chemical or physical curing agents, and the like, as are well known by those of skill in the art. The curing conditions vary with respect to the polymeric precursors selected. In certain aspects, the polymer formed from the polymeric precursor is a thermoset polymer. The thermoset polymer or precursors thereof may be formed from any kind of thermoset resin or precursors thereof. By way of non-limiting example, the thermoset polymer precursors may include epoxies, polyesters, polyimides, phenols, bismaleimides, polyurethanes, or any derivatives, co-polymers or combinations thereof. However, it should be noted that any other resins or polymeric precursors known or to be developed in the art are likewise contemplated in certain alternative aspects of the present disclosure.

The applied tension is then released. A solid composite structural part or article is thus formed that comprises a cured polymer and the pre-stressed textile reinforcement.

In certain alternative variations, the preform may include multiple layers, which are subjected to tension layer by layer prior to curing and solidifying.

The method may also include an additional step prior to the pre-stressing, where the preform of the textile reinforcement is disposed within a three-dimensional formwork, so that the solid composite article formed has a shape defined by the three-dimensional formwork. By three-dimensional shape, it is meant that the shape has at least one contoured region that is not flat (e.g., two-dimensional), but rather is curved, convex, concave, protruding or inverted, by way of example. The three-dimensional shape may include a variety of complex surface contour patterns to form complex three-dimensional shapes. The polymeric precursor may then be introduced to (within openings) of the preform disposed on the formwork. The curing and solidifying of the polymeric precursor can be conducted while the preform is under tension and disposed within the formwork. The tension may be released and the solid composite form comprising the cured polymer and the pre-stressed textile reinforcement is removed from the formwork. As such, the solid composite article thus formed defines at least one three-dimensional shape.

In certain variations, the present disclosure contemplates a composite article comprising a pre-stressed seamless knitted lightweight reinforcement structure and a cured polymer. The cured polymer is optionally a thermoset polymer selected from a group consisting of: epoxies, polyesters, polyolefins, polyimides, phenols, bismaleimides, polyurethanes, derivatives, copolymers, and combinations thereof. In certain aspects, the pre-stressed seamless knitted reinforcement structure comprises a yarn (a fiber or filament, which may be fibers and/or fiber tows) selected from a group consisting of: carbon fiber, glass fiber, polymeric fibers, metal fibers, and combinations thereof. In certain variations, the polymeric fiber may be an aromatic polyamide, such as an aramid or para-aramid fiber commercially available from DuPont as KEVLAR™, by way of non-limiting example. In other variations, the polymeric fiber may be a polyolefin, such as polypropylene or polyethylene, such as ultra-high-molecular-weight polyethylene (UHMWPE) commercially available as DYNEEMA™ commercially available from DSM. In other aspects, a polymeric material yarn may be a polyurethane-polyurea copolymer, such as polyelastane. In other aspects, the yarn may be a thermoplastic, such as a thermoplastic monofilament. Any combination of such materials/yarns is also contemplated. By way of example, structural fibers, such as such as an aramid or para-aramid fibers, carbon fibers, and the like may be combined with thermoplastic yarns or tows, such as polypropylene.

By way of example, a range of knitted samples are contemplated that use polypropylene yarns and tows, integrated with a combination of structural yarns, including Kevlar and carbon fiber. In one example, a stretch-broken twisted carbon fiber yarn and a polypropylene thermoplastic yarn can be combined together. Later application of heat and/or pressure will consolidate and melt the polypropylene under heat and/or pressure. Controlling the stitch structure and the composition of the yarn can generate proper infiltration and proportion of the melted thermoplastic yarn to the structural fibers. Thus, the present disclosure contemplates using combination fibers, such as comingled spun yarns, that combine structural fibers and thermoplastic fibers together for use in a composite article, where the composite has consolidated polymer and the a pre-stressed textile reinforcement.

In certain aspects, the present disclosure further provides methods and apparatuses for knitting a preform of the textile on a knitting machine while also using a robotic tool or arm providing an ability to locally consolidate a knitted textile. As noted above, use of certain fibers or yarns, such as thermoplastic yarns, can provide the ability to form knitted textile composites that may be consolidated. The thermoplastic arm may serve as the matrix material when woven into the preform textile or may supplement matrix materials later added to the preform textile. In certain aspects, the present disclosure contemplates a system that may include a robotic arm or tool that permits consolidation to take place through customized application of heat and/or pressure to the knitted preform. In one variation, a process may include a CNC or robotically controlled consolidation process, where the robotic tool (e.g., disposed on a controllable robotic arm) includes a translating or rotating pressure source that can be moved across the knitted textile. The robotic arm may also have a tool that has an energy source, such as a hot gas torch, laser, IR, microwave, or ultrasound energy source that can cause melting and distribution of a matrix material. In certain aspects, the robotic arm has a combined tool pressure application and/or energy application, although they may also be separate tools. The combined pressure and/or energy application can cause melting and distribution of matrix material, which may be initially present within the textile as a yarn. The ratio of matrix to reinforcement fiber/material (or volume fraction) is controllable via the knitting process. The specific location of energy and consolidation is also varied via numerical control.

In certain aspects, the consolidation force may be transmitted by a tool having a rolling wheel, which may be shaped to provide specific features like ribs, and may interleave with a counterpart on a second tool. This wheel maybe servo driven in order to minimize lateral forces on the textile, as consolidation primarily results from normal forces.

The above process can be extended by utilizing two robotic or CNC controlled end effectors concurrently, as well as combinations of external kinematic positioners to control the location of the textile in 3D space. By utilizing pressure and/or energy from both sides of the textile in order to maintain equilibrium of the shape of the textile, rigid tooling or molds are not required. The form is pre-shaped by applying controlled tension to the boundary of the textile which has been 3D knitted, and the consolidation process locks the geometry into the designed shape, even after removal from the pre-stress fixture. It can then be further processed, laminated, and the like using conventional hot pressing or molding techniques, if required.

In certain other embodiments, the present disclosure contemplates the possible inclusion of fiber placement over a knit, extrusion process to create "mega" spacer fabrics and the like.

In yet other variations, a composite article is provided that comprises a pre-stressed seamless knitted reinforcement structure. The knitted reinforcement structure comprises a first knitted region and a distinct second knitted region. The first knitted region has a first pre-stress level, while the second knitted region has a second pre-stress level this is either greater or smaller than the first pre-stress level. The composite article also comprises a cured thermoset polymer. Suitable non-limiting pre-stress levels may be greater than or equal to zero to less than or equal to about 50% of the maximum tensile strength of the preform, in certain variations.

In certain aspects, the first knitted region and the second knitted region vary from one another by at least one property selected from the group consisting of: stitch pattern, stitch density, stitch length, stitch spacing, yarn composition, yarn thickness, rigidity, flexibility, and combinations thereof. While not limiting, in certain variations, the first knitted region has a first rigidity level and the second knitted region has a second rigidity level, wherein the first rigidity level is at least 25% greater than the second rigidity level, optionally the first rigidity level is at least 50% greater than the second rigidity level, optionally the first rigidity level is at least 75% greater than the second rigidity level, optionally the first rigidity level is at least 100% greater than the second rigidity level, optionally the first rigidity level is at least 125% greater than the second rigidity level, optionally the first rigidity level is at least 150% greater than the second rigidity level, optionally the first rigidity level is at least 175% greater than the second rigidity level, and in certain variations, optionally the first rigidity level is at least 200% greater than the second rigidity level.

The cured thermoset polymer may be selected from a group consisting of: epoxies, polyesters, polyimides, phenols, bismaleimides, polyurethanes, derivatives, copolymers, and combinations thereof. The pre-stressed seamless knitted reinforcement structure comprises a yarn selected from a group consisting of: carbon fiber, glass fiber, polymeric fibers, metal fibers, and combinations thereof. In certain other variations, the pre-stressed seamless knitted reinforcement structure comprises a yarn selected from a group consisting of: carbon fiber, glass fiber, aramid fibers, and combinations thereof. The pre-stressed seamless knitted reinforcement structure may define at least one three-dimensional shape.

Such a solid composite increases mechanical performance, including modulus, strength, durability and fatigue life. The applications in which the composites formed in accordance with the principles of the present disclosure can be used are diverse and will have a major impact on the manufacturing of composite structures for improved mechanical performance. Such composite structures may include aerospace structural components, such as fuselages, wings and other parts, ship structural components, infrastructure (civil) structural components, rail, and automotive structural components.

The following examples investigate the influence of certain processing parameters during the fabrication of knitted composites, namely knit density and applied uniaxial tension on a final composite material's properties. The effect of these parameters on the failure mechanisms is also investigated. The dry knit preforms for the composites may be either knitted glass or knitted para-aramid S3/M3 (KEVLAR™).

The composites are made from dry knit preforms that are infused with an epoxy (US Composites 635 Thin Resin System with a 3:1 Medium Epoxy Hardener). Conventional knitted composites offer lower structural performance as compared to unidirectional type reinforced composites. However, by optimizing certain parameters during the fabrication stage, vast improvements can be made to the final product. Of the many production parameters that can be controlled, two are investigated here: knit density of the fabric and applied uniaxial tension (during the resin impregnation/curing stage).

Figures 1A, 1B:
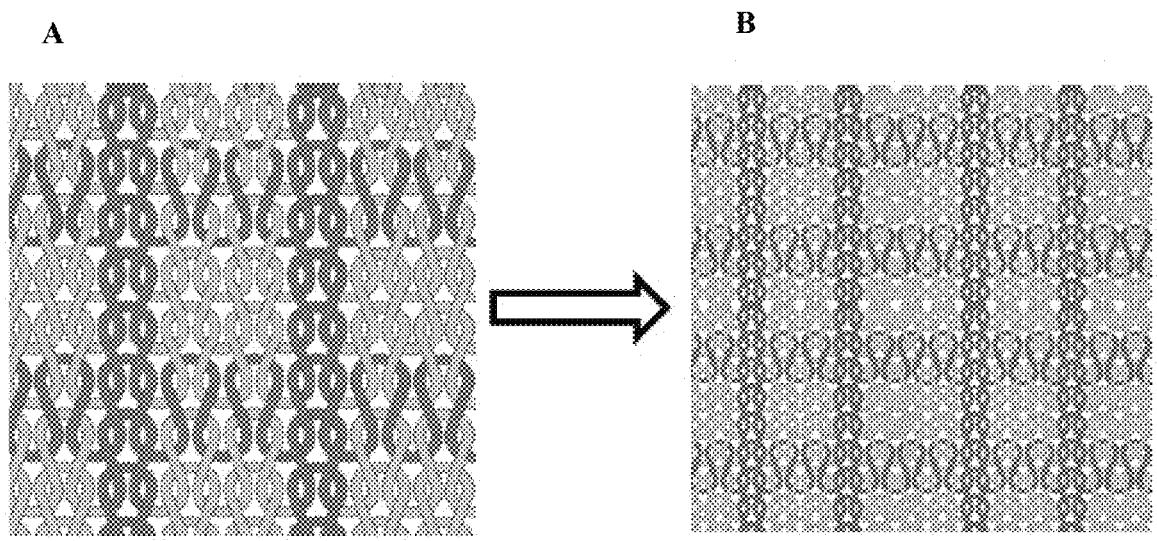

FIGS. 1A-1B show how knitted fiber reinforcements can be controlled in accordance with certain aspects of the present disclosure, where FIG. 1A has a preselected stitch or knit density that is lower (and thus has a longer stitch length) than that shown in FIG. 1B. FIG. 1B has a greater knit or stitch density (and thus have a shorter stitch length).

Figures 2A, 2B, 2C:
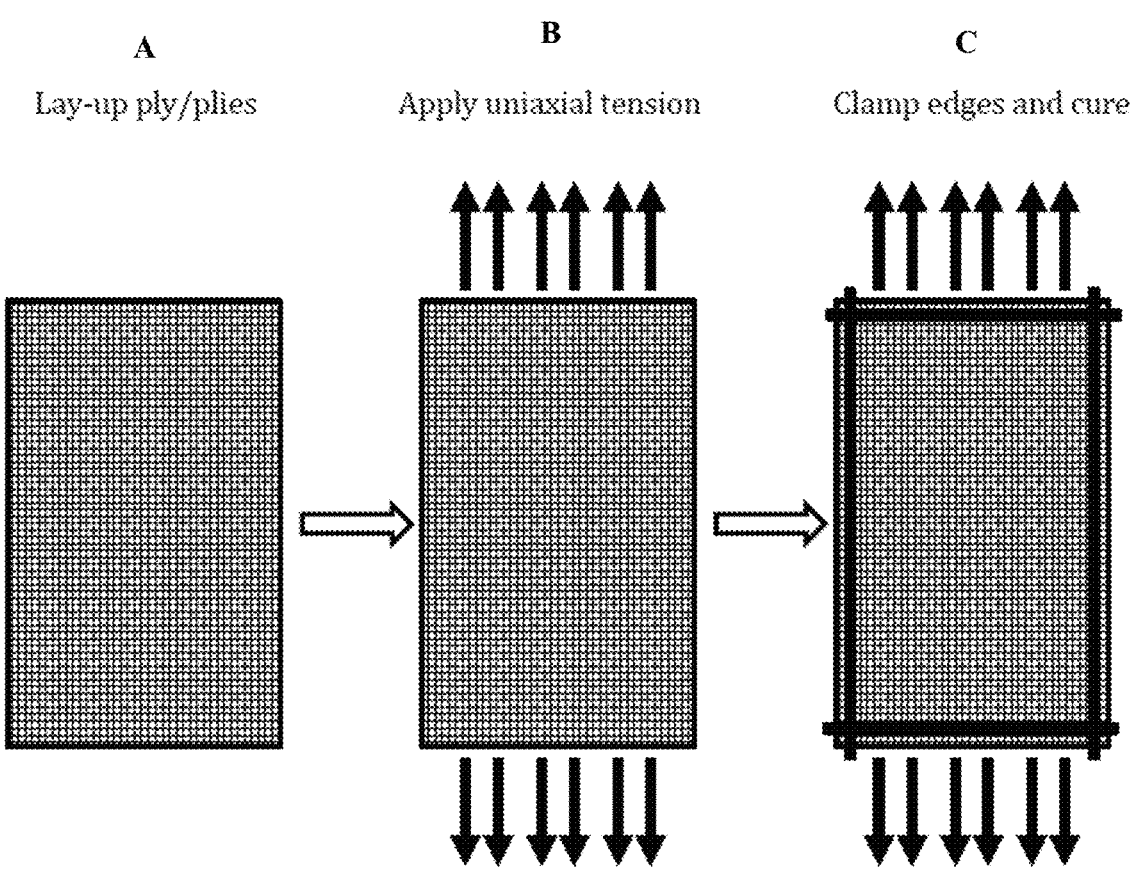

FIGS. 2A-2C show applied uniaxial tension applied to a test sample of knitted reinforcement textile. FIG. 2A shows dry lay-up reinforcement ply or plies before any induced tension. In FIG. 2B, uniaxial tension is applied as shown. Then, resin is introduced into the ply/plies. In FIG. 2C, the edges of the ply/plies with resin are clamped on all sides while tension is still applied. The resin is then cured.

Figure 3:
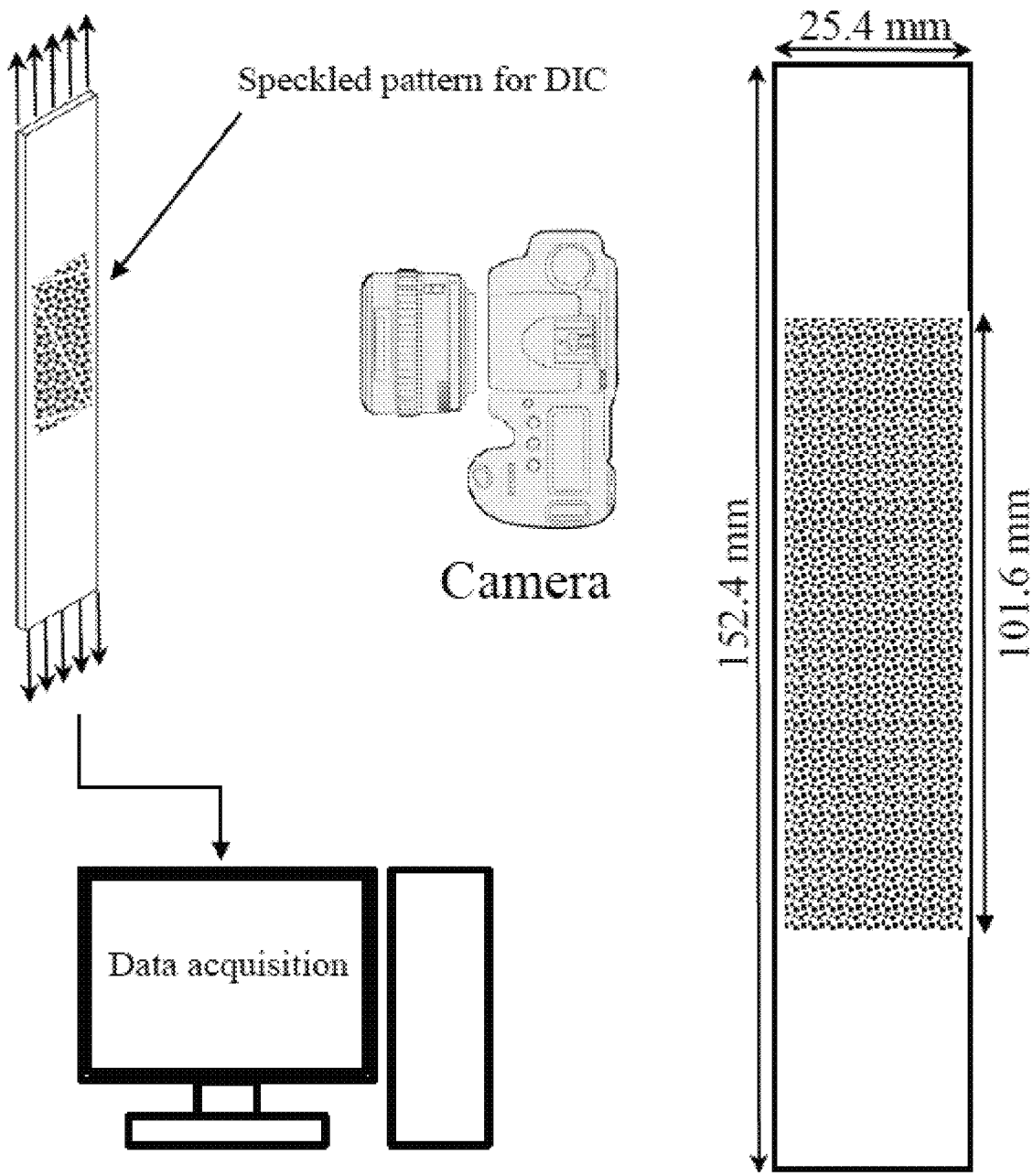

A test set up is shown in FIG. 3. All the tests are conducted on an INSTRON™ testing machine at quasi-static testing rates (of 0.004 inch/sec). In order to capture specimen deformation and arrive at strain fields, Digital Image Correlation (DIC) is employed. In DIC, the specimen is first painted white and speckled with black paint. The specimen is shown to have dimensions of 25.4 mm by 152.4 mm, while the speckled painted region is 101.6 mm by 25.4 mm. The quasi-static deformation of the specimen is then captured using a camera and this sequence of images is fed into a computer program that is capable of accurately calculating the displacements and strain fields based on the relative displacements of the speckles/dots. Other relevant parameters such as specimen stiffness and strength can then be conveniently computed. For all the cases shown here, the specimen load has been plotted against machine actuator displacement, the reason being that specimen experienced significant deformation prior to failure. Consequently, the speckled pattern is lost at points of matrix cracking or is "stretched out" beyond resolution for the DIC computer program. Hence, the values of the elastic moduli may be used only for comparative purposes.

Figures 4A, 4B, 4C, 4D, 4E:
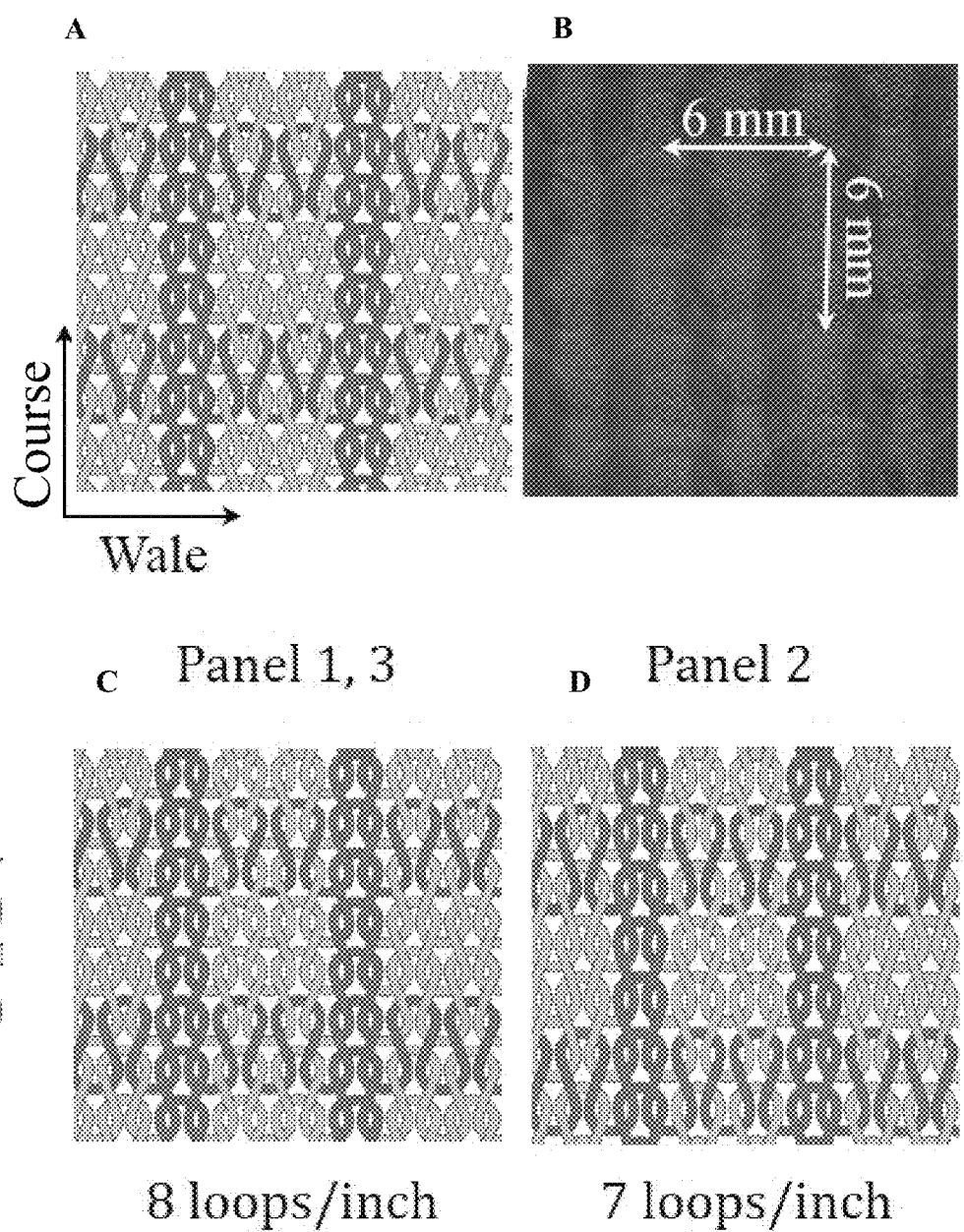

A knitted glass composite is tested primarily to investigate the effect of knit density on the final material characteristics. FIGS. 4A-4E show various views of the knitted glass textile. FIG. 4A is a schematic of the knitted glass textile, while FIG. 4B is a close-up photograph of the knit structure. This particular type of knit pattern is called the knit/purl stitch and a single layer of the knitted fabric (with a mean thickness of 1.15 mm) is used to fabricate the reinforcement for the composite. Panels 1 and 3 shown in FIG. 4C have a knit density of 8 loops/inch, while panel 2 in FIG. 4D has a knit density of 7 loops/inch. The tests are carried out in the weaker coordinate (i.e., the coarse direction). FIG. 4E is a detailed view of the stitch pattern.

Figure 5:
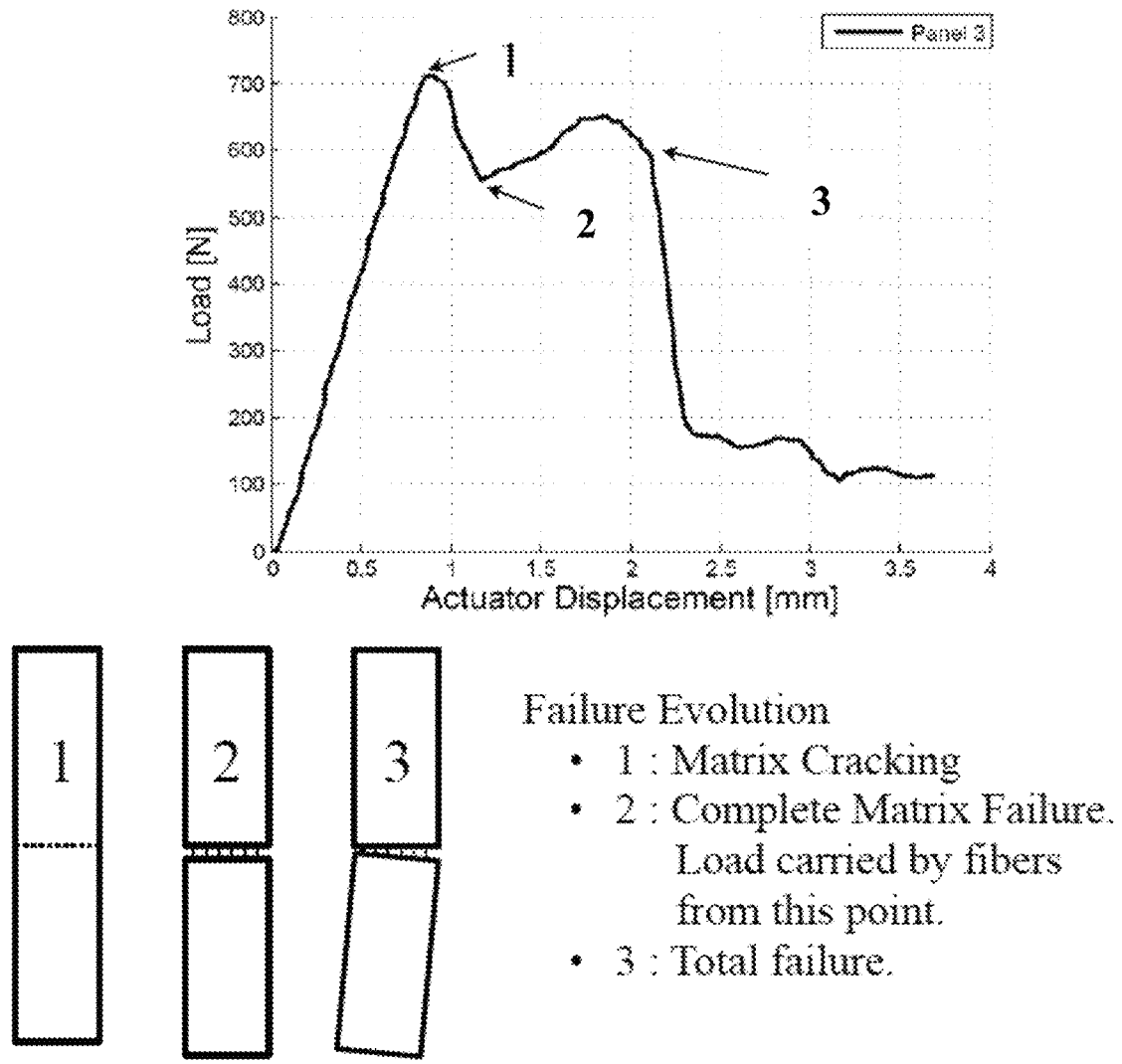
FIG. 5 shows a load-displacement curve for test sample panel 3, along with the failure pattern observed.

FIG. 5 shows a typical load-displacement curve, along with the failure pattern observed for panel 3. As seen, the load increases linearly with displacement till the point of initial matrix cracking. The curves then soften as the load is increasingly transferred to the fibers. This is then followed by intermittent peak as the fibers bear the load completely until the point of failure.

In FIG. 5, failure evolution is shown in the schematic and on the graph of actual displacement (mm) versus load (N), where No. 1 shows matrix cracking, No. 2 shows complete matrix failure, where the load is carried by fibers from this point on. No. 3 shows total failure of the glass fiber composite material. Table 1 shows the loads at matrix cracking (N), fiber rupture (N), and at total failure (N) for panels 1-3.

TABLE 1

Loads for the knitted glass composites.

|  | Matrix Cracking Load (N) | Fiber Rupture Load (N) | Total Failure Load (N) |
| --- | --- | --- | --- |
| Panel 1 | 786 | 573 | 676 |
| Panel 2 | 594 | 434 | 645 |
| Panel 3 | 734 | 544 | 650 |

Figure 6:
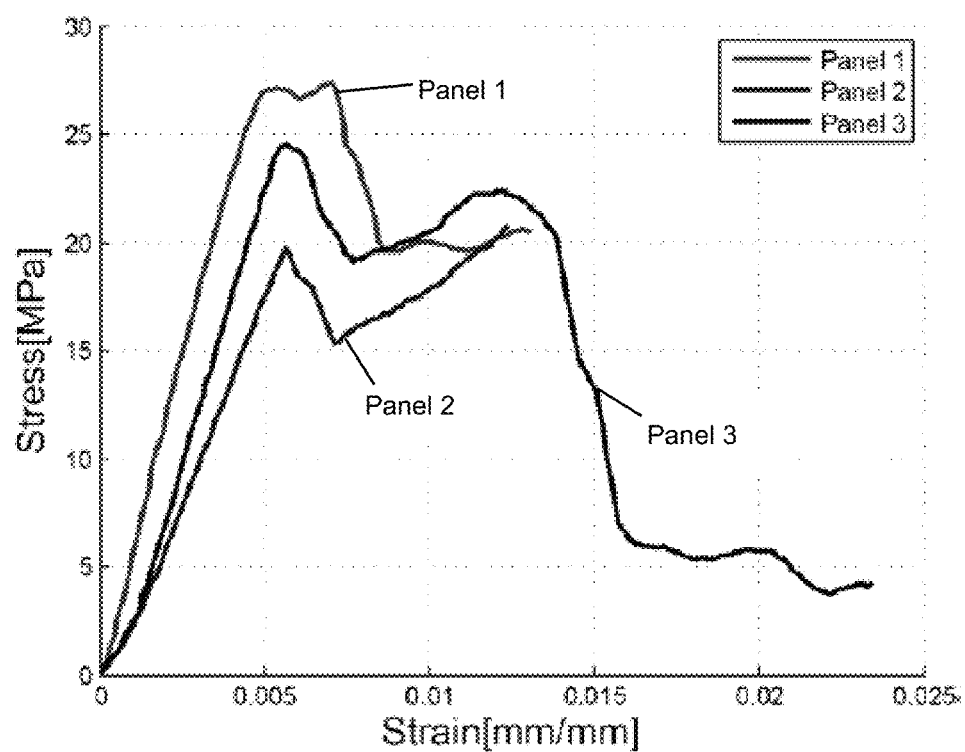
FIG. 6 shows a typical load-displacement curve for a knitted glass composite (sample panels 1-3).

A typical load-displacement curve for the knitted glass composite is shown in FIG. 6. The elastic moduli of the glass knitted composites of FIG. 6 are shown in Table 2. The values of elastic moduli are observed to be higher in Panels 1 and 3 with 8 loops/inch. Based on these results, a higher knit density appears to contribute to greater stiffness.

TABLE 2

Elastic moduli for the knitted glass composites.

|  | Ecoarse (GPa) |
| --- | --- |
| Panel 1 | 3.77 ± 2.16 |
| Panel 2 | 3.42 ± 0.11 |
| Panel 3 | 4.60 ± 0.42 |

Two separate types of knitted KEVLAR™ (para-aramid fiber) composites are tested: type S3, which had a higher knit density, but no applied uniaxial tension during fabrication and type M3, which had a medium knit density with 440N of uniaxial tension applied along the 90° (weft) during fabrication. FIG. 7A shows a photograph of S3 knitted KEVLAR™ fiber panel, while FIG. 7B shows a photograph of M3 knitted KEVLAR™ fiber panel. The grade of fiber and resin used is the same in both the samples. For both S3 and M3, tests are carried out in the 0°, 45°, and 90° directions. FIG. 7C shows a schematic of the S3 knitted KEVLAR™ fiber panel with the 0°, 45°, and 90° directions of tension and an inset of a photograph of the S3 panel, while FIG. 7B shows a schematic and inset photograph of the M3 knitted KEVLAR™ fiber panel with the 0°, 45°, and 90° directions. Further details about these composites have been elaborated in the Table 3. The tension is in a range about 80-100 grams hung weight on the edges.

TABLE 3

Details about S3 and M3 knitted KEVLAR ™ fiber panels.

|  | S3 Panel | M3 Panel |
| --- | --- | --- |
| Panel Thickness | 1 mm | 1 mm |
| Tension Amount | — | Weft |
| Tension Direction | — | 440 N |
| Knit Direction | Weft | Weft |
| Knit Density | Strong | Medium |

Typical load-displacement curves in the 0°, 45°, and 90° directions have been shown in FIGS. 9A-9C for the S3 laminate. FIG. 9A is a typical load-displacement curve observed at 0°, FIG. 9B at 45°, and FIG. 9C at 90°. In FIGS. 9A-9C, Step 1 commonly shows matrix cracking. In FIG. 9A, Step 2 shows successive matrix crack formation, while load carried by fibers. Warping of the specimen is observed. Shear bands are formed before failure. In Step 2 of FIG. 9B, successive matrix crack formation is shown, where the load is carried by fibers. Specimen warping and shear bands are observed. In Step 2 of FIG. 9C, successive matrix crack formation occurs along 0° fibers. In each of FIGS. 9A-9C, Step 3 results in total failure.

In all the cases, the load linearly rises with displacement until the initial matrix crack. After this, the curves assumes a plateau with the fibers stretching out (in the case of 0°, 45°) or further matrix cracks appearing along the width of the specimen (as in the case of 90°). An important point to note is that for all the three directions, the plateau curve region is significant in terms of specimen displacement (see Table 4). This points towards noticeable energy absorption capabilities.

TABLE 4

Loads for the S3 panel laminate.

|  | Matrix Cracking Load (N) | Total Failure Load (N) | Actuator Displacement at failure (mm) | Test Time (min) |
| --- | --- | --- | --- | --- |
| 0° | 562 | 603 | 29.01 | 54 |
| 45° | 593 | 676 | 32.39 | 58 |
| 90° | 1010 | 1190 | 12.34 | 25 |

FIG. 10 shows a stress-strain curve for the S3 composite. As seen in the stress-strain curves, the laminate is stiffer in the 90° (weft) direction. A possible explanation to this is that the direction of the knit is along weft, and hence the knit-interlocking mechanism plays a greater role and offers higher resistance.

As with the previous case, typical load-displacements curves have been shown for the M3 knitted composite along the 0°, 45° and 90° directions. While the 0° and 45° laminates have successive intermittent peaks after the linear portion (indicating continual matrix unloading-fiber loading), the 90° specimen displays a steady stiffening after the initial matrix crack. The 90° specimen also sustains a much greater load than the other case and is significantly stiffer. This can be attributed to the applied uniaxial tension during the fabrication phase. When the M3 laminate is un-clamped after curing, the static tensile load on the Kevlar fabric is suddenly un-loaded. This causes the matrix to be compressed by a small amount. Therefore, when tested in the same direction as the applied tension (weft or 90°), the matrix has to overcome this semi-compressed state first. This phenomenon can significantly improve the stiffness (and hence, the elastic modulus in the 90°/weft direction), while retaining the inherent energy absorption property due to knit interlocking. The failure mechanisms, load table and the stress-strain curves are shown in FIGS. 11, 12A-12C, and 13 below.

FIG. 11 shows typical load displacement in each of directions 0°, 45°, and 90° for a M3 knitted KEVLAR™ fiber panel. Typical load-displacement curves in the 0°, 45°, and 90° directions have been shown in FIGS. 12A-12C for the M3 laminate are shown. FIG. 12A is a typical load-displacement curve observed at 0°, FIG. 12B at 45°, and FIG. 12C at 90°. In FIGS. 12A-12C, Step 1 commonly shows matrix cracking. In FIG. 12A, Step 2 shows successive knit elongation and individual fiber failure, while Step 3 shows total failure. In FIG. 12B, Step 2 shows successive matrix crack formation, where load is carried by the fibers and shear bands are observed. Step 3 in FIG. 12B shows total failure. In FIG. 12C, Step 2 shows total failure.

Stress-strain curves are shown for the M3 panel in FIG. 13.

TABLE 5

Loads for the M3 panel laminate.

| | Matrix Cracking Load (N) | Total Failure Load (N) | Actuator Displacement at failure (mm) | Test Time (min) |
|---|---|---|---|---|
| 0° | 465 | — | 1.044 | 20.88 |
| 45° | 716 | — | 1.082 | 43.65 |
| 90° | 1847 | 2366 | 0.499 | 45.23 |

A comparison of the stress-strain curves between the S3 and the M3 composite is provided here. From the values of the elastic moduli, it is evident that applied uniaxial tension makes the M3 laminate much (almost twice) stiffer than the S3 composite, while not affecting the moduli in the other directions. Hence, in applications where greater stiffness is required in one direction, this principle may be applied without sacrificing the stiffness in the other directions.

FIGS. 14A-14D shows a comparison of stress-strain curves, S3 versus M3 knitted KEVLAR™ composites. FIG. 14A shows stress-strain curves comparing S3 and M3 panels at 0°. FIG. 14B shows stress-strain curves comparing S3 and M3 panels at 45°. FIG. 14C shows stress-strain curves comparing S3 and M3 panels at 90°. FIG. 14D is a table showing comparative elastic moduli for S3 and M3.

The present disclosure thus contemplates new methods for the design and manufacturing of highly anisotropic textile-based composite materials provided by flat-bed weft-knitting technologies. With these methods, a range of integrated properties is possible within a single material, including forgiving, soft, stretchable textiles to ductile morphable composites. Tailoring material quality within a single hybrid textile-composite material is provided in accordance with certain aspects of the present disclosure by the (i) ability to knit (plate) with a range of yarns, (ii) vary the knit structure in density and fiber orientation, and (iii) isolate areas for solidification. In varying the yarn quality and knit structure, a unique capacity is introduced where isolated pre-stressing of the textile is thus possible. The pre-stressing offers at least two primary benefits. First, it allows for the loops of the knit to be attenuated in response to desired structural performance. Second, the pre-stressed regions if left un-solidified (select regions not having any polymeric precursor applied and cured) produce a "rebounding" behavior affecting the final three-dimensional (3D) form of the material.

Leveraging flat-bed weft-knitting techniques, multiple textile layers and 3D forms can be created without any need for post-production (cutting and sewing) or complex 3D formwork, significantly easing costs of production. When using such knitting techniques, waste is reduced to nearly zero, while a single unitary seamless textile structure is formed. Utilizing the effect of rebounding allows manufacturing of a desired 3D geometry from a flat mold. The resulting material type has been termed a pre-stressed Knit Reinforced Composite (pKRC). With detailed control of local knit and ile/composite structure, pKRC materials can dictate critical aspects of material comfort, deformation response, structural buckling, ductility and vibratory response in a desired and predetermined manner. Further, a seamless reinforce material reduces or eliminates the regions most susceptible to structural or mechanical failure (e.g., joints and seams) in conventional composite assemblies having 3D shapes.

The structure of a knitted textile and the process of forming composites are variables that drive the definition of highly specific and differentiated material qualities, composed within singular seamless material elements. As noted above, the methods of the present disclosure contemplate use of weft knitting, where complex 3D textile structures and spacer fabrics can be produced with continuous fibers without the need for post-production, in cutting and sewing. Differentiated weft-knitted textiles as tensile surfaces and complex tent-like structures are possible. The use of a preform is unnecessary as the influence of pre-stress provides a post-forming process, with the ability to transform an initially flat geometry to a complex 3D material.

By way of example, FIGS. 15A-15D show a prototype of a formation process for one embodiment of a method to create pre-stressed knit reinforced composite materials (pKRC). In FIG. 15A, a multi-layer composition of textiles is flat-formed as a differentiated composite, using vacuum impregnation of an epoxy resin. In FIG. 15B, an integrated pre-stressed textile is activated when the masking is removed, as shown in FIG. 15C. The flat sheet in FIG. 15D is transformed into a highly ductile seamless 3D material.

Pre-stressed knit reinforced composite materials (pKRC) can exhibit both residual internal pre-stress in the textile reinforcement, as well as bending pre-stress in the solidified composite regions. The processes of forming the pKRC materials have a great degree of variability, thus able to produce a wide range of material properties. In varying the density of the knitted textiles (stitch length) and the layers of material through using flat-bed weft-knitting technology, the stiffness in both the pre-stressed and solidified areas can be preselected and tuned. Within a seamless material, this allows for the flexibility and responsiveness of the material to be localized. Issues such as vibration control can be managed as well, where areas can be designed for varying degrees of damping. With the relationship to curing time, a material can be partially stiffened in its 3D state. While ductility can still be maintained, certain areas can be designed to retain their 3D curvature, when external stresses are applied. If the impregnated polymeric precursor resin has been allowed to sufficiently cure while the material is in the desired 3D configuration, then under external force, it may retain some of its 3D nature. These aspects are shown in FIGS. 16A-16B.

In FIGS. 16A-16B, stressing of a prototype shows how curvature has been embedded into the material, because the epoxy matrix has been allowed to cure while in the "rebounded" 3D state. In FIG. 16A, the same linear tension force is applied as in the pre-stressed textile, but does not return the part to its initial flat state. In FIG. 16B, the application of torsion shows the ductility and transformational possibilities of the prototype.

Structural analysis of the pKRC materials is then conducted. The pKRC length scales involved span from the fiber/matrix scale (micromechanics) to the RUC (representative unit cell) scale, and finally to the macro-structural scale, so that a holistic view of the deformation response needs to be characterized. The fundamental scientific objective of developing such an analytical procedure is to obtain a mechanistic understanding of deformation response and energy absorption of pKRC materials by developing an experimentally validated computational mechanics framework. This new framework can provide a virtual testing tool for the insertion of advanced multi-material and multi-layered pKRC structural materials to improve operational performance of such composites for multiple service functions.

For automotive applications, pKRC materials are applicable for conditions where variable stiffness is critical, including aspects of seating in support, comfort, patterning for structure and finishing quality, and integration of smart fibers for responsiveness and adaptability in material structure. This structural analysis can provide additional understanding regarding the response of a structure made of multiple length scale materials, and predictive mechanistic design tools for deformation response and failure prediction of structures that encompass different length scales, such as in pKRC materials. Computational modeling of pKRC structural components for load bearing applications are thus contemplated and discussed herein.

FIGS. 17A-17D show prototypes of an example of pKRC materials according to certain aspects of the present disclosure that are post-formed from a flat-bed vacuum process. FIG. 17A shows highly deformed composite webbing with integrated textile, which forms into doubly curved surfaces. FIG. 17B shows utilization of narrow strips of micro-thin wood veneer (1/64 inch width) laminated with epoxy to pre-stressed polyester/Spandex textile. FIGS. 17C-17D show a differentiated composite, which exhibits both a folded (FIG. 17C) and semi-flat (FIG. 17D) bi-stable configuration.

The proposed finite element (FE) based computational framework will be based on a global-local modeling strategy as illustrated in FIG. 18, for computational efficiency. The micro-model that includes the detail of the pKRC architecture will be selectively used in regions where multi-scaling is required. These could be regions of "hot-spots" such as the region in a central portion of a three-point flexure test. However, the multi-scale framework is equally valid for multi-scaling throughout the domain of consideration.

The micro-model is a collection of representative unit cells (RUCs) created based on a particular pKRC architecture. It includes a collection of homogenized textile tows and polymer matrix within the spaces created by the textile tow architecture. As shown in FIG. 18, tow shearing and kinking failure is captured using a smeared crack model, as described in Heinrich et al., "Investigation of Progressive Damage and Fracture in Laminated Composites Using the Smeared Crack Approach," *CMC-COMPUTERS MATERIALS & CONTINUA*, 35 (2), pp. 155-181 (2003), the relevant portions of which are incorporated herein by reference 1. The properties of fiber tows within the RUCs are determined based on the concentric cylinder model and the formulation of Schapery theory (ST). ST is a thermodynamically based damage mechanics modeling strategy that has been used successfully with laminated pre-preg based composites, for example. Its use for textile composite tows is new. The deformation response of a textile composite structure is strongly influenced by the textile architecture, which in turn is influenced by the fiber and matrix properties. These multi-scale, two-way interactions are captured in a validated computational scheme in order to properly utilize the full potential offered by these structural materials, especially to control the manner by which deformation, damage and failure events occur.

Real-Time Simulation of Composite Fabric Dynamics is discussed herein. In order to facilitate design and fabrication, numerical methods for simulation are developed that have strong structure-preserving as well as real-time properties. There are numerous goals for the simulations: (1) structural predictions of composite fabrics, (2) real-time rendering strategies and (3) prediction of oscillatory and acoustic properties. To this end, two types of numerical methods are explored.

In a first numerical method, structural predictions of composite fabrics are being simulated using both spring-based numerical methods and finite element analysis (FEA). Early results are depicted here, where the simulation methods are utilized to replicate material properties as well as the post-forming process. Thus, the initial states of the geometric model are flat and static, where the 3D form that is realized, through iterative steps of simulation, contains the tensile and residual bending stresses.

FIGS. 19A-19D show form-finding of post-formed geometries based on simulating stiffnesses and pre-stress in spring-based methods (FIGS. 19A-19B) and finite element analysis (FEA) (FIGS. 19C-19D). FIGS. 19A-19B depict the comparison between a digitized model (from the prototypes in FIGS. 20A-20B) and a simulated model using spring-based methods, where stiffnesses are relative based upon Hooke's Law of Elasticity. FIGS. 19C-19D show the use of finite element analysis (FEA), with specific material descriptions, to design composite regions, which accomplish a desired buckling in the post-forming process.

In a second numerical method, real-time numerical simulation can be used in interactive design processes and allow the rapid exploration of different shape and knitting patterns without incurring a material, machine time and other costs. Furthermore, the ability to predict dynamic properties of the fabric, such as oscillations, that might have relevance for acoustic properties or prefigure potential structural stability properties would be desirable. FIGS. 21A-21B show comparative simulations of propagation between homogenous knit (FIG. 21A) and differentiated knit (FIG. 21B) and demonstrate a simplified model of knitting fabric in terms of directional inhomogeneities and is related to homogeneous propagation modeling. FIG. 21A shows the propagation simulation for a perfectly homogeneous (theoretical) knit. FIG. 21B incorporates a horizontal knitting pattern and shows the disruption of the wavefront due to the pattern.

Thus, in certain aspects, pKRC materials are formed by a weft-knitting process, which can enable (i) the manufacturing of 3D (and shaped) knit reinforcement structures, (ii) utilization of commingled yarns, such as poly/elastane, KEVLAR™, DYNEEMA™ and/or thermoplastic monofilament, by way of non-limiting example, and (iii) localized integration (plating) of thermoplastic monofilaments for highly specific placement of stiffness within the knitted textile. Additionally, the flat-bed weft-knitting technology is easily setup and programmed for knitting of multiple highly differentiated parts that are produced with ease. Such pKRC materials can be used to form components for various applications, including for the automotive, aerospace, and transportation industries, as well as in architectural applications, where operational performance and aesthetic quality have to be highly specific, tuned and variable within a single continuous material structure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a load bearing composite article comprising:
   placing a textile reinforcement preform into a three-dimensional formwork, wherein the composite article has a shape defined by the three-dimensional formwork;
   pre-stressing the textile reinforcement preform by applying uniaxial tension thereto;
   introducing a liquid polymeric precursor into the pre-stressed textile reinforcement preform to partially or fully fill openings in the textile reinforcement preform after the textile reinforcement preform is placed into the three-dimensional formwork;
   curing the polymeric precursor; and
   releasing the applied tension to form the load bearing composite article comprising a cured polymer embedding the pre-stressed textile reinforcement.

2. The method of claim 1, further comprising forming the textile reinforcement preform prior to the pre-stressing.

3. The method of claim 2, wherein the forming comprises knitting the textile reinforcement preform into a unitary seamless structure.

4. The method of claim 3, wherein the knitting is conducted on a computer numerical control (CNC) flat bed weft knitting machine.

5. The method of claim 3, wherein the knitting forms a first knitted region and a distinct second knitted region in the textile reinforcement preform, wherein the first knitted region and the second knitted region vary from one another by at least one property selected from the group consisting of: stitch pattern, stitch density, stitch length, stitch spacing, yarn composition, yarn thickness, yarn denier, yarn weight, yarn ply, yarn degree of twist, rigidity, flexibility, and combinations thereof.

6. The method of claim 1, wherein the introducing of the polymeric precursor is only to select regions of the pre-stressed textile reinforcement preform.

7. The method of claim 1, wherein the introducing of the polymeric precursor is to the entire pre-stressed textile reinforcement preform.

8. The method of claim 1, wherein the knitted reinforcement structure comprises a first knitted region and a distinct second knitted region, and the pre-stressing creates a first pre-stress level in the first knitted region and a second pre-stress level in the distinct second knitted region that is greater than the first pre-stress level.

9. The method of claim 8, wherein the first knitted region has a first rigidity level and the second knitted region has a second rigidity level, wherein the first rigidity level is at least 25% greater than the second rigidity level.

10. The method of claim 1, wherein the liquid polymeric precursor forms a cured thermoset polymer selected from the group consisting of: epoxies, polyesters, polyimides, phenols, bismaleimides, polyurethanes, derivatives, copolymers, and combinations thereof.

11. The method of claim 1, wherein the pre-stressed seamless knitted reinforcement structure comprises a yarn selected from the group consisting of: carbon fiber, glass fiber, polymeric fibers, metal fibers, and combinations thereof.

12. The method of claim 1, wherein the pre-stressed seamless knitted reinforcement structure comprises a yarn selected from the group consisting of: carbon fiber, glass fiber, aramid fibers, polyelastane fibers, polyolefin fibers, thermoplastic monofilaments, and combinations thereof.

13. A method of making a load bearing composite article comprising:
   placing a textile reinforcement preform into a three-dimensional formwork, wherein the composite article has a shape defined by the three-dimensional formwork;
   pre-stressing the textile reinforcement preform by applying uniaxial tension thereto;
   introducing a liquid polymeric precursor into the pre-stressed textile reinforcement preform to partially or fully fill openings in the textile reinforcement preform after the textile reinforcement preform is placed into the three-dimensional formwork;
   curing the polymeric precursor; and
   releasing the applied tension to form the load bearing composite article comprising a cured polymer embedding the pre-stressed textile reinforcement, wherein the load bearing composite article is a structural component for at least one of an automotive structure, an aerospace structure, a rail structure, a ship structure, a transportation structure, an infrastructure structure, or an architectural structure.

14. The method of claim 13, wherein the forming comprises knitting the textile reinforcement preform into a unitary seamless structure.

15. The method of claim 14, wherein the knitting is conducted on a computer numerical control (CNC) flat bed weft knitting machine.

16. The method of claim 14, wherein the knitting forms a first knitted region and a distinct second knitted region in the textile reinforcement preform, wherein the first knitted region and the second knitted region vary from one another by at least one property selected from the group consisting of: stitch pattern, stitch density, stitch length, stitch spacing, yarn composition, yarn thickness, yarn denier, yarn weight, yarn ply, yarn degree of twist, rigidity, flexibility, and combinations thereof.

17. The method of claim 13, wherein the introducing of the polymeric precursor is only to select regions of the pre-stressed textile reinforcement preform.

18. The method of claim 13, wherein the introducing of the polymeric precursor is to the entire pre-stressed textile reinforcement preform.

* * * * *